(12) United States Patent
Gabrys et al.

(10) Patent No.: US 7,888,839 B2
(45) Date of Patent: Feb. 15, 2011

(54) COMMERCIAL LOW COST, HIGH EFFICIENCY MOTOR-GENERATOR

(75) Inventors: Christopher W. Gabrys, Reno, NV (US); Timothy S. Rodgers, Santa Barbara, CA (US)

(73) Assignee: Revolution Electric Motor Company, Inc., Reno, NV (US)

( * ) Notice: Subject to any disclaimer, the term of this patent is extended or adjusted under 35 U.S.C. 154(b) by 914 days.

(21) Appl. No.: 10/592,842

(22) PCT Filed: Mar. 14, 2005

(86) PCT No.: PCT/US2005/008618

§ 371 (c)(1),
(2), (4) Date: Sep. 14, 2006

(87) PCT Pub. No.: WO2005/089327

PCT Pub. Date: Sep. 29, 2005

(65) Prior Publication Data

US 2008/0231131 A1 Sep. 25, 2008

Related U.S. Application Data

(60) Provisional application No. 60/553,298, filed on Mar. 14, 2004, provisional application No. 60/602,948, filed on Aug. 19, 2004.

(51) Int. Cl.
*H02K 3/47* (2006.01)
*H02K 3/02* (2006.01)
*H02K 16/00* (2006.01)

(52) U.S. Cl. ............... 310/266; 310/195; 310/133; 310/140; 310/156.74; 310/132; 310/268; 310/112; 310/114; 310/156.37

(58) Field of Classification Search ............ 310/156.74, 310/198, 132, 113, 195, 156.32, 133, 140, 310/266, 268, 112, 156.37, 114, 207; H02K 3/47, H02K 16/00
See application file for complete search history.

(56) References Cited

U.S. PATENT DOCUMENTS 5,311,092 A * 5/1994 Fisher ..................... 310/266

(Continued)

OTHER PUBLICATIONS

The Standard Handbook for Electrical engineers Thirteenth Edition, R.R. Donnelley & Sons Company, pp. 4-117-4-120 (1993).*

*Primary Examiner* — Karl I Tamai
*Assistant Examiner* — Terrance Kenerly
(74) *Attorney, Agent, or Firm* — J. Michael Neary

(57) ABSTRACT

A motor-generator includes a rotor that rotates about an axis of rotation, and a stator that is stationary and magnetically interacts with the rotor. The rotor is constructed of two spaced apart rotor portions having magnetic poles that drive magnetic flux across an armature airgap formed therebetween. An armature, located in the armature airgap, has a substantially nonmagnetic and low electrical conductivity form onto which wire windings are wound. The form has a free end that extends inside the rotor, and a support end that attaches to the stationary portion of the motor-generator. The form is constructed with a thin backing portion and thicker raised portions extending from the backing portion in the direction of the magnetic flux. The wire windings have multiple individually insulated conductor wire. The conductors of a single wire are electrically connected together in parallel and electrically insulated between each other along their length inside the armature airgap. The wire windings are wound on to the form by inserting the wire to lie between the raised portions; the form provides position location and support for the wire windings during the winding process, and subsequently reacts the electromagnetically induced torque on the windings to the stationary portion of the motor-generator through the support end of the form and prevents the windings from contacting the rotor portions during rotation of the rotor.

40 Claims, 19 Drawing Sheets

U.S. PATENT DOCUMENTS

| | | | |
|---|---|---|---|
| 5,619,087 A * | 4/1997 | Sakai | 310/268 |
| 5,675,203 A * | 10/1997 | Schulze et al. | 310/113 |
| 5,710,476 A * | 1/1998 | Ampela | 310/268 |
| 5,751,085 A * | 5/1998 | Hayashi | 310/90 |
| 5,982,074 A * | 11/1999 | Smith et al. | 310/261 |
| 6,137,201 A * | 10/2000 | Umeda et al. | 310/179 |
| 6,388,353 B1 * | 5/2002 | Liu et al. | 310/156.09 |
| 6,531,799 B1 * | 3/2003 | Miller | 310/114 |
| 6,750,588 B1 * | 6/2004 | Gabrys | 310/268 |
| 7,084,548 B1 * | 8/2006 | Gabrys | 310/268 |
| 2001/0010433 A1 * | 8/2001 | Watanabe | 310/12 |
| 2003/0020353 A1 * | 1/2003 | Lopatinsky et al. | 310/208 |
| 2004/0245877 A1 * | 12/2004 | Khalizadeh | 310/113 |
| 2006/0038460 A1 * | 2/2006 | Bojiuc | 310/198 |

* cited by examiner

COMMERCIAL LOW COST, HIGH EFFICIENCY MOTOR-GENERATOR

This is related to U.S. Provisional Application Nos. 60/553,298 filed on Mar. 14, 2004 and 60/602,948 filed on Aug. 19, 2004, and to PCT Application No. PCT/US2005/008618 filed on Mar. 14, 2005, which was published as International Publication No. WO 2005/089327 on Sep. 29, 2005, all under the title "Commercial Low Cost, High Efficiency Motor-Generator.

This invention pertains to electrical machines for converting between electrical and mechanical energy, and more particularly to a low cost, high efficiency motor-generator having a special low cost armature winding construction that very high efficiency and is easily and rapidly wound and assembled.

BACKGROUND OF THE INVENTION

Electric motors consume more than half of all electrical energy used in most countries. Currently, the majority of all motors used are induction motors. Induction motors provide simple and reliable operation and have relatively low costs. Unfortunately, induction motors do not provide the highest efficiency.

Some applications of motors and generators run continuously or near continuously. In such applications, the annual electricity consumption costs can be several times greater than the acquisition cost of the motor. Increasing the efficiency of motors used for these applications could provide significant economic benefits.

Another type of motor that can provide higher efficiency than induction motors is the brushless permanent magnet motor. Because the field flux in permanent magnet motors is produced by magnets instead of electrically excited windings as in induction motors, they can operate more efficiently. Unfortunately, conventional brushless permanent magnet motors are much more expensive than induction motors. They also do not always provide a great enough increase in efficiency and energy savings to justify the increased cost and make them an economically viable alternative, except where the functional benefits of brushless permanent magnet motor necessitate their use.

One way to increase the efficiency of brushless permanent magnet motors is to eliminate eddy current and hysteresis losses occurring in laminations by eliminating the use of electrical laminations in construction. In such motors, the armature comprises windings with an air core instead of being wound into slots in the laminations. This type of construction also provides the benefits of reduced winding inductance for higher speed operation. As such, these types of motors are small and typically used in cameras, dental drills, flywheel energy storage systems and specialized application servomotors. Despite their potential for increased efficiency, air core permanent magnet brushless motors utilize more magnet material and require an armature that is more difficult, time consuming and costly to construct. In addition, some constructions can also result in increased armature losses, reducing the potential energy efficiency gains. For these reasons, such motors have not been widely used in commercial applications for replacement of induction motors.

Thus, a new construction motor-generator is needed with high efficiency and lower costs for widespread commercial applications. Such a motor-generator could provide a higher efficiency and commercially attractive replacement for induction motors as well as other types, and would reduce electricity consumption operating costs.

SUMMARY OF THE INVENTION

The invention provides a lower cost, high efficiency motor-generator. The motor-generator achieves both high efficiency and lower costs by utilizing an air core topology with a special low cost armature winding construction that is more easily and rapidly wound and assembled.

The motor-generator has a rotor that rotates about an axis of rotation, and a stator that is stationary and magnetically interacts with the rotor. The rotor is comprised of two spaced apart rotor portions that define therebetween an armature airgap in which a stationary aircore armature is located. Magnetic poles on the rotor portions drive magnetic flux across the armature airgap and through the armature. The rotor portions provide a low reluctance, high efficiency magnetic flux path for linking the magnetic flux traversing back and forth across the air gap. The rotor portions are preferably constructed of ferromagnetic material, such as steel, which reduces the circumferential reluctance of the flux path and increases the total flux density, power capability, and efficiency.

It should be noted that in the past, some motor-generators for unique applications have been construction using a single rotor surface acting on a single side of an air core armature. Such designs provide the benefits of simplified assembly and can provide acceptable performance for some applications, especially high speed ones where only a low magnetic flux density is needed for production of high power due to the high operating speed. However, for maximized power capability and efficiency per cost in accordance with this invention, a split rotor is used, enclosing an air core armature on both sides. This is especially applicable for low speed and very cost sensitive applications typical of induction motors.

The stator of the motor-generator according to this invention has an air core armature, located within the magnetic air gap. The air core armature has windings that are wound onto a winding form designed to afford simplified winding of the armature, and a simple and speedy winding process for applying the windings onto the form. The form is made of a substantially nonmagnetic and low electrical conductivity material, and has a free end that extends inside the rotor and a support end that attaches to the stationary portion of the motor-generator. The form has a thin backing portion and thicker raised portions in the direction of the magnetic flux through the magnetic airgap. Wire windings are wound onto the form by inserting wire to lie between the raised portions, wherein the form provides position location and support for the wire windings during the winding process, and subsequent transmission or reaction of the electromagnetically induced torque on the windings to the stationary portion of the motor-generator through the support end of the form, and prevents the windings from contacting the rotor portions during rotation of the rotor. Use of raised portions on the form in the active length portions can circumferentially hold the wires.

One consideration in the selection of the material properties of the form material is to preclude development of significant eddy current losses in the form from the rotation of the magnetic poles and currents in the windings to avoid wasted power and generation of waste heat internally in the motor. In motors used for high efficiency, the losses arising from the form are preferably less than 1% and more preferably less than 0.1%. Low electrical conductivity materials for the form have a resistivity of greater than $1\times10^{-6}$ ohm-m and more preferably greater than 0.001 ohm-m. A good class of materials are plastics having sufficient strength and temperature capability to carry the magnetically induced forces acting on the windings. The addition of a very thin film, layer or foil of conducting material on the form surface for heat reflection or shielding would not change the resistivity of the majority of the form material in the airgap or develop significant eddy current losses. As such, this conducting film would constitute another aspect of the invention.

An additional preferred property of the form material is that it be substantially nonmagnetic. The goal is to prevent loss of performance from significant circumferential direction flux leaking through the form. Preferably the form material has a relative magnetic permeability of less than 100 and more preferably of less than 3. Again, plastics are one such class of good materials.

Unlike many conventional air core motor-generators that are made by winding the armature coils separately, then assembling them together around the circumference of the armature and compressing the windings to minimum thickness for potting, the armature according to this invention is constructed by manufacturing the form first and then winding the windings directly onto the winding form, simplifying construction. The form then allows easy mounting of the armature and windings directly into the motor-generator.

Use of the winding form in accordance with the invention has several significant drawbacks that generally make it considered an unattractive approach in the art for armature construction For a given amount of expensive magnet material in a motor-generator, the power capability and efficiency of air core motor-generators is directly related to the winding density of the armature. For this reason designers have typically sought to maximize the winding density of armatures and minimize the required airgap thickness. Smaller magnetic airgaps allow significantly greater magnetic flux density and hence the greater efficiency and power capability. Winding forms for armature windings occupy substantial space in the magnetic airgap that could other wise be filled with additional windings if manufactured by conventional techniques. The space occupied by the backing of the form increases the armature thickness in the direction of the magnetic flux and the raised portions reduces the number of windings circumferentially around the armature compared to non-form constructions. Compounding the lower winding density from a single armature form is that large armatures in accordance with the invention may utilize multiple forms that are assembled or stacked together in the magnetic airgap. The use of stacked armature form construction can have each phase wound in a single layer, and results in larger winding end turn lengths, and greater resistive losses.

Despite the disadvantages resulting from reduced armature winding density, motor-generators in accordance with the invention have surprisingly been found to be a very attractive construction and manufacturing technique. Although reduced winding density does require some increased amount of magnet material and magnet costs to achieve the same high power level and efficiency as other motor-generators, this increased magnet cost has been found to be much less than the manufacturing cost savings achieved from the simplified armature manufacturing and reduced total manufacturing time. Any efficiency reduction has also been found to be made up for by the other features for the windings, as will be explained, that are offered by the form winding process.

The form on which the windings are wound is preferably made of a substantially nonmagnetic and low electrical conductivity material, such as nylon, Noryl, Ultem, ABS or a fiber-reinforced plastic. It may also be made of thermally conducting polymers, ceramics such as Macor or other suitable materials that are easily and inexpensively produced, for example by machining, pressing, molding or forming, and afford adequate strength to support the forces acting on the windings in the particular size of motor or generator. Thermally conductive polymers are considered to be those with a thermal conductivity of greater than 1 W/mK. These materials can increase the thermal energy transport from the windings through the forms and to the convection cooling in the armature airgap. A preferred manufacturing technique for the form is injection molding because it is rapid and low cost and allows formation of complex channel construction easily.

In one embodiment, the form has channels on the surface for placement of the wire. The channels provide structural support for the windings and preferably hold the windings in place on the form while winding. Particularly for large size, or high speed or high pole count electrical motor-generators, eddy current losses can become significant in the actual winding conductors from the rotating rotor flux passing through them. To reduce these losses to a low level, the windings are preferably wound using Litz wire, or wire comprised of multiple individually insulated strands. The stranded wire facilitates easy winding of large wires due to the reduced bending stiffness. However, because Litz wire windings are up to 100 times or more less stiff and rigid as solid wire windings, they do not stay in the desired place unless constrained in some fashion. For this reason, winding air core armatures with Litz wire by previous methods would be difficult. The wound coils or windings would tend to spring out of the desired winding pattern, which would make construction difficult. However, winding Litz wire windings onto the form in accordance with the invention is easily accomplished because, after the wires are pressed into the channels, the channels hold the wires in place. In a preferred embodiment of the invention, the channels clamp the wire and hold it tight. Other configurations of loss mitigating windings can be constructed from parallel-connected square or ribbon wires that are electrically insulated between each other along their length in the active length region. Again, the high flexibility of these windings takes substantial advantage of the forms clamping during the winding process. The efficiency gains from the windings can overcome the efficiency losses resulting from lower winding density as a result of the form.

Multiple wires may be laid into a single wind channel, or each wire may be laid in an individual channel. Individual channels provide greater support since a group of wires in a single channel may bow outward in the center of the channel and come loose, but individual channels may further reduce the winding density depending on their construction and location. Individual channels are formed when the space between adjacent raised portions on the low electrical conductivity form has a width approximately equal to the width of one wire. For easiest winding and manufacturing, the armature is constructed preferably with only one wire per channel. When the wire is inserted in to the channel, it is squeezed across its' diametral cross-section to hold it in place. For Litz wire windings, the wire can become slightly compressed as it is held in place.

The channels or surface features of the form allow for rapid and reliable armature winding. Unlike other manufacturing methods, the winding wires need not be threaded through multiple holes or openings. Instead, the windings are simply pressed or snapped into the correct channels on the form surface. The winding process may be automated or simply and reliably done by hand by putting the windings in place in the channels with a hand roller. The forms may be machined with the channels or surface features or, for high volume production, are injection molded.

A further benefit of the invention is that the armatures can be wound with high precision. Unlike hand winding with other constructions, the forms militate against winding mistakes and error by having surface features that facilitate winding by providing positive position location for wires during the winding process. Incorrect positioning of coils in a multiple phase motor-generator, as can occur with wound, arranged, assembled and potted construction, is precluded with the inventive winding process. No phase voltage or angle imbalance occurs, further improving performance.

The motor-generator can also facilitate easy replacement of windings when required. Unlike conventional slot wound armature windings that are epoxied into the motor laminations and housing, the armature, or even a part of the armature, in accordance with the invention can unbolted and removed and replaced, if needed.

The channels or surface wire holding features of the forms may be constructed by several means depending on the desired winding pattern. The windings may comprise coils or more preferably are constructed in a serpentine path around the circumference. The channels can provide a full channel that receives the wire completely over the entire winding surface of the form. This method provides the greatest structural support and also provides insulation between adjacent turns of the windings. Non-sheathed Litz wire, which is more compressible, can be utilized if desired. The use of a complete channel however can reduce the possible winding density, especially for axial gap motor-generators. To prevent further reduction in the potential winding density and to reduce costs for machined forms, the channel-defining raised portions can extend from the form backing only in selected portions, such as in the active length region, a portion of the active length region or only near the ends of the active lengths. An incomplete channel over the form surface can slightly increase the difficulty of winding, but this increase is generally small compared to the benefits gained in winding density.

Many motor-generators utilize a three-phase construction. In accordance with the invention, all three phases may be wound onto a single form if end turn channels are omitted. Alternatively, in a preferred embodiment, each phase is wound identically into separate forms. The forms are then axially stacked together, shifted in angular orientation to form a multi-phase axial gap motor-generator. For radial gap motor-generators, the form or forms would be in the form of a thin walled cylinder with radially extending channels. In most cases, axial gap construction is the easiest and most cost effective and therefore is the most preferred when allowable. An adhesive such as epoxy can be applied to the wound forms to increase the structural integrity of the armature in the stacked configuration. Vacuum resin impregnation can also be performed on the assembled armature, if desired for greater structural integrity, however this may increase cost and manufacturing time and may be unnecessary in many cases.

To allow for stacking or assembly of multiple armature forms, the backing portion of the form is preferably omitted in regions where overlapping of winding wires on a single form occurs. Such overlapping is typically the result of the input and output connection wires to the armature. Multiple forms preferably omit the backing from the same regions so that the overlapping does not prevent orderly stacking.

In many cases, the armature construction uses multiple wires per phase and hence multiple wires electrically in series but mechanically in parallel serpentines around the diameter. Multiple wires may be run at one time with one pass around the diameter to form the windings. The wires are then connected together appropriately such that successive turns are electrically in series. In a preferred embodiment, the windings are preferably wound by winding one wire, or less than the total number of wires, several turns around the diameter. This method eliminates the multiple intra-winding connections or soldier joints and speeds manufacturing. This type of winding technique is made possible with the use of individual winding channels so that the turns of each pass around the diameter are positioned and held in place in the appropriate locations.

Although the motor-generator can be utilized for many applications using motors and generators, it is particularly well suited for applications with continuous or near continuous operation. One such preferred application is for fans or blowers used for providing airflow. A particular application is in clean rooms. In these and similar applications, the motor-generator may provide substantial electricity cost saving compared to standard induction motors, currently employed. The low cost of the motor-generator compared to other brushless permanent magnet motor-generators enables it to be a commercially viable and cost effective alternative. The benefits of the motor-generator, which also include substantially reduced size, weight and noise along with efficiency, provide benefits for other motor-generator applications as well.

In a further aspect of the invention, the winding density can be increased and assembly made easier by precompressing the Litz wire prior to winding the armature. When the channels in the form are made to have a rectangular cross-section, the Litz wire can be precompressed to a substantially matching rectangular or near-rectangular cross-section. The precompressing of the wire can be done in the wire manufacturing process through the use of set gap rollers. The rollers provide a high instantaneous pressure on the wire passing through and hence greatly compact the wire bundle. The rectangular wire can then be wound and pressed into the rectangular form channels. Little or no further compaction pressure on the whole armature may be needed. Care should be taken during the winding process to orient the wire properly into the channels and the wire spool is preferably supported for rotation to prevent twisting of the wire in the winding process.

The low electrical conductivity form with channels can be fabricated several different way, including machining from a plastic blank, forming, or by molding, such as matched die molding or injection molding. Use of injection molding affords low unit costs for high volume production. In a preferred embodiment, the form is constructed by injection molding prior to winding the armature. To facilitate improved heat transfer, the form can be made of a thermally conductive polymer, if desired. Regardless of the form thermal conductivity, the mounting of the form to the stationary motor-generator structure can be providing with means to accommodate thermal expansion of the armature with respect to the stationary housing. Such accommodations can include oversized mounting holes, radial slots or an elastic or flexible connection. Such mounting precludes development of potentially deleterious stresses in the form from operation and relative thermal expansion of the form.

The multi-phase motor-generator can be wound with one phase on each form, with the forms superimposed and angularly off-set to provide the desire number of phases, or can be wound with multiple phases on a single form. Each method has desirable properties for different applications and designs. For instance, in a radial gap motor-generator, using a single form can have advantages of simplicity by avoiding the nesting together of several individual cylinders with different radii for the different phases. When more than one phase is wound onto a single form, end turn overlapping can be used to allow the active length region to be thinner in the direction of the magnetic airgap than the end turns, for increased performance.

Several different winding patterns can be constructed, again depending on the design of the machine, operating parameters and cost. In some cases, it is possible to increase the efficiency of the motor-generator by the spacing of the windings. In an additional embodiment of the invention, the windings of a phase are spaced more closely together circumferentially in the active length region than if circumferentially uniformly distributed about the pole pitch. This configuration places more windings near the center of a pole for higher voltage inducement and less windings located in the region of inter-magnet leakage.

For radial gap motor-generators, the form can comprise a tube with radially raised channels and a thin backing portion. To facilitate easier assembly of the rotor and armature, the end turns of both ends of the armature preferably extend radially in opposite directions. This allows the armature to be inserted into the rotor and the magnets to be installed. For simplicity, the backing portion of the tube form can be made to allow the end turns of the windings to extend radially inward at the free end of the air core armature. One way to do this is to omit the backing form of the form at the free end end-turns. The rotor and stator can be assembled by attaching the magnets to the outer rotor tube, sliding the armature axially into the rotor, and then axially sliding the magnets onto the inner rotor portion. Alternatively, the magnets can be attached to the inner rotor portion before attaching it to the rotor, and then, after the armature has been inserted into the outer rotor tube, the magnet-loaded inner rotor portion can be inserted inside the armature and attached to the rotor.

Another aspect of radial gap motor-generators is a armature winding compaction method. The windings can be wound on the channels on the outer surface of the form. A tension wound wrapping, such as a filament, tape, etc., can be wound circumferentially around the form. The wrapping compacts the windings into the channels for an accurate dimensioned and high-density air core armature.

In yet a further embodiment of the invention, axial gap motor-generators can be constructed to provide easy winding, high dielectric strength, high density, and easy assembly. The windings are wound with only one phase per form and the forms are axially stacked together to construct a multiple phase armature. To allow flat stacking and prevent overlapping of the windings, the forms preferably have axial holes for exiting of the winding leads from the forms. In a preferred version, the windings are wound as a serpentine path and a multiple wire serpentine is formed by winding multiple times circumferentially around the form. In this construction, the coil of a single phase has only two wires and only one end needs to use an axial hole in the forms for exiting to prevent overlapping. Holes for both ends can also be used for simplicity to allow all the wires to exit the armature from one axial side. A benefit of this construction is that the windings can be fully supported throughout the whole armature. Additionally, the channels can dielectrically isolate all the windings. This can allow the use of un-served Litz wire, which is more flexible and more easily compacted.

Features of the invention can be used in the both small and large motors and generators. For very large motor-generators, such as large turbine generators, the armature form can be constructed from multiple circumferential sections that are easier to manufacture. The sections can then be assembled and electrically connected together to form a large armature that would otherwise not be practical or economical to construct as a single piece. Applications for the motor-generators include stationary and transportation, wherever the advantages of high efficiency and high performance at reduced cost are desirable, including industrial process motors, manufacturing, hybrid electric vehicles and ship propulsion.

DESCRIPTION OF THE DRAWINGS

The invention and its many attendant features and benefits will become better understood upon reading the following detailed description of the preferred embodiments in conjunction with the drawings, wherein.

DESCRIPTION OF THE PREFERRED EMBODIMENTS

Figure 1A:
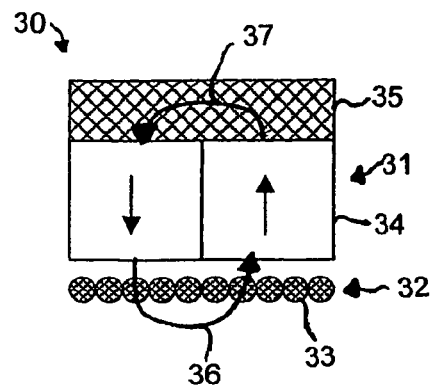
FIG. 1A is a schematic partial elevation of a brushless permanent magnet motor-generator with single sided rotor.

Turning to the drawings, wherein like reference characters designate identical or corresponding parts, four different magnetic configurations for air core motor-generators are shown in FIGS. 1A-1D for comparison. FIG. 1A shows a small portion of a motor-generator 30 with rotor 31 and stator 32. The stator 32 is comprised of electrical armature windings 33 in close proximity to the rotor 31 for conversion of energy. The rotor 41 comprises alternating polarity magnets 34 attached to a lightweight non-magnetic rotor portion 35. The rotor rotates relative to the stationary stator so, in operation, the magnets 34 pass laterally across the windings 33 in a direction perpendicular to the length of the wire and parallel to the plane in which the wire lies. The magnets 34 drive flux in a loop 36 through the windings 33 and back again around the loop 37 through the rotor portion.

Figure 1B:
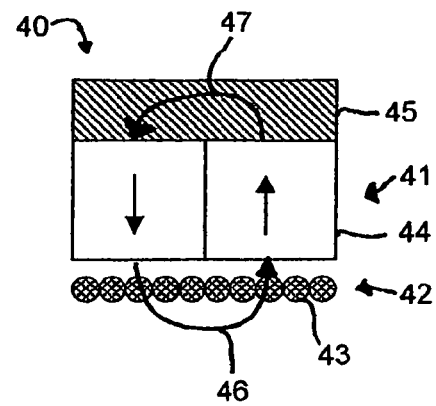
FIG. 1B is a schematic partial elevation of a brushless permanent magnet motor-generator with single sided rotor and ferromagnetic back iron.

A motor-generator 40 shown in FIG. 1B has a rotor 41 rotating relative to a stationary stator 42. The stator 42 includes electrical armature windings 43 in close proximity to the rotor 41 for conversion of energy. The rotor 41 comprises alternating polarity magnets 44 attached to a ferromagnetic rotor portion 45. As the rotor rotates and carries the magnets across the armature windings 43, the magnets 44 drive flux in a loop 46 through the windings 43 and back again through the loop 47 through the low reluctance steel rotor portion 45.

Figure 1C:
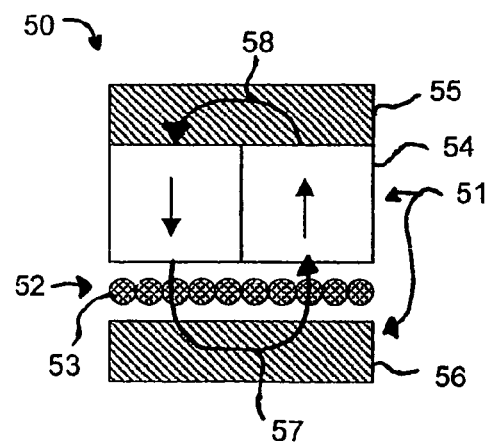
FIG. 1C is a schematic partial elevation of a brushless permanent magnet motor-generator with double sided rotor and ferromagnetic back irons.

FIG. 1C shows a motor-generator 50 with rotor 51 and stator 52. The stator 52 is comprised of electrical armature-windings 53 in close proximity to the rotor 51 for conversion of energy. The rotor 51 comprises alternating polarity magnets 54 attached to a ferromagnetic rotor portion 55 and a spaced apart ferromagnetic rotor portion 56 acting as a back iron. The rotating array of magnets 54 drive flux in a loop 57 through the windings 53 and low reluctance steel portion 56, and through the loop 58 through the low reluctance steel rotor portion 55.

Figure 1D:
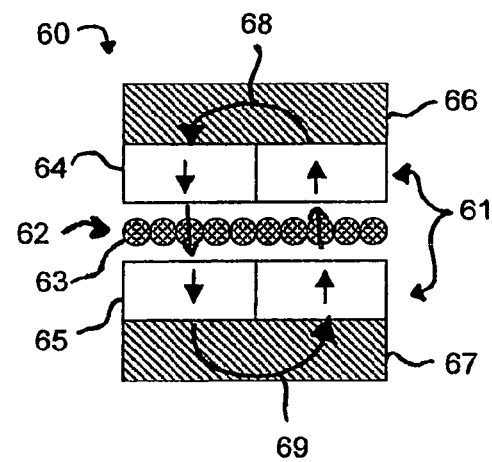
FIG. 1D is a schematic partial elevation of a brushless permanent magnet motor-generator with double sided rotor with magnets on both sides and ferromagnetic back irons.

FIG. 1D shows a motor-generator 60 with rotor 61 and stator 62. The stator 62 is comprised of electrical armature windings 63 in close proximity to the rotor 61 for conversion of energy. The rotor 61 comprises alternating polarity magnets 64 and 65 attached to ferromagnetic rotor portions 66, 67, which rotate together. The rotating array of magnets 64, 65 drive flux in a loops 68, 69 through the windings 63 and the low reluctance steel portions 66, 67.

Figure 2:
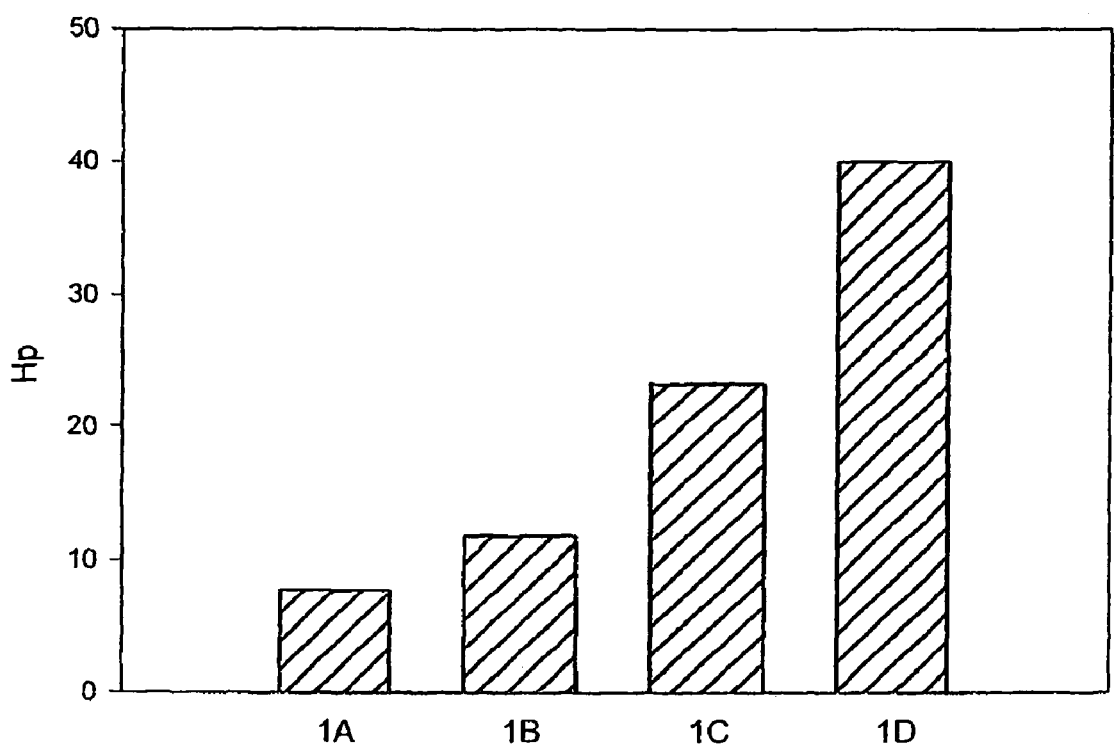
FIG. 2 is a graph comparing horsepower capability of the configurations 1A-1D.

A comparison of the power capacity of the different magnetic configurations 1A-1D is shown in FIG. 2. Each design uses an equivalent amount of magnet material and the power ratings are calculated based on achieving 98% efficiency. Although configurations 1A and 1B allow simple assembly by having the rotor on only one side of the armature, the power capability is lower at 7.75 Hp and 11.75 Hp. This power per cost is acceptable for some applications but not for competition with low cost induction motors. The configuration of FIG. 1C provides steel back irons for efficient circumferential flux paths on both sides of the armature. This provides a substantial improvement, more than doubling the power capability. Use of ferromagnetic rotor portions on both sides of the armature is therefore preferred for use with electrical machines in accordance with the invention. FIG. 2 shows that the configuration of FIG. 1D can afford yet more improvement by placing half of the magnet on each ferromagnetic rotor. This configuration causes more flux to jump across the magnetic airgap and through the armature instead of leaking circumferentially. As a result, the power capability increases from 23.25 Hp to 40 Hp, providing the highest power rotor magnetic design configuration. In low inertia requirement applications, it is also contemplated that a Halbach motor magnet array with non-magnetic rotor portions, could alternatively be used. However, this configuration results in significantly higher costs that are typically not compatible for most commercial applications.

Figure 3A:
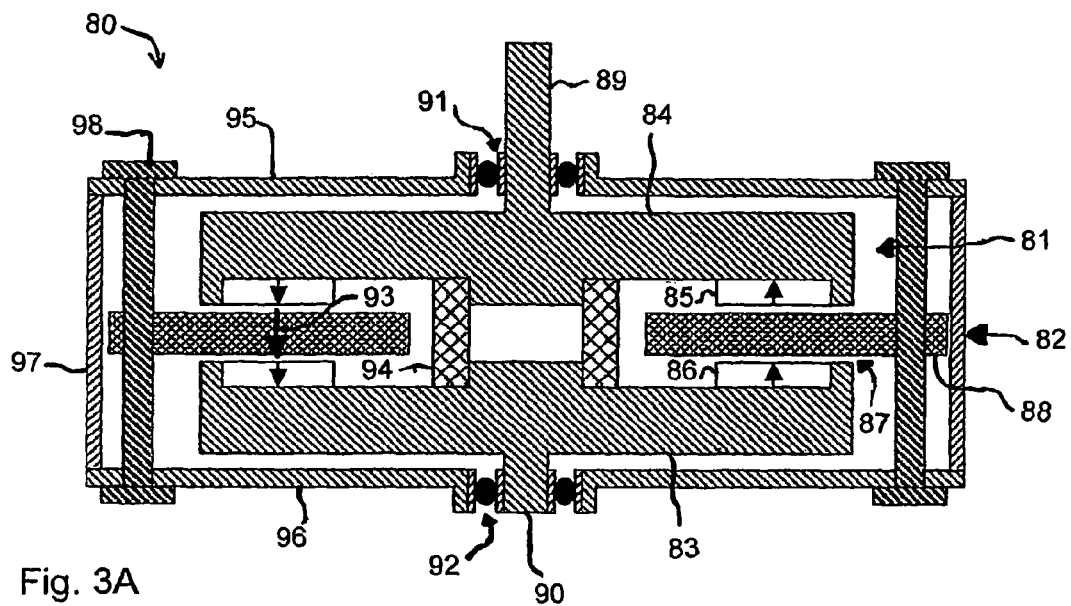
FIG. 3A is a schematic elevation of an axial gap brushless permanent magnet motor-generator in accordance with the invention.
Figure 3B:
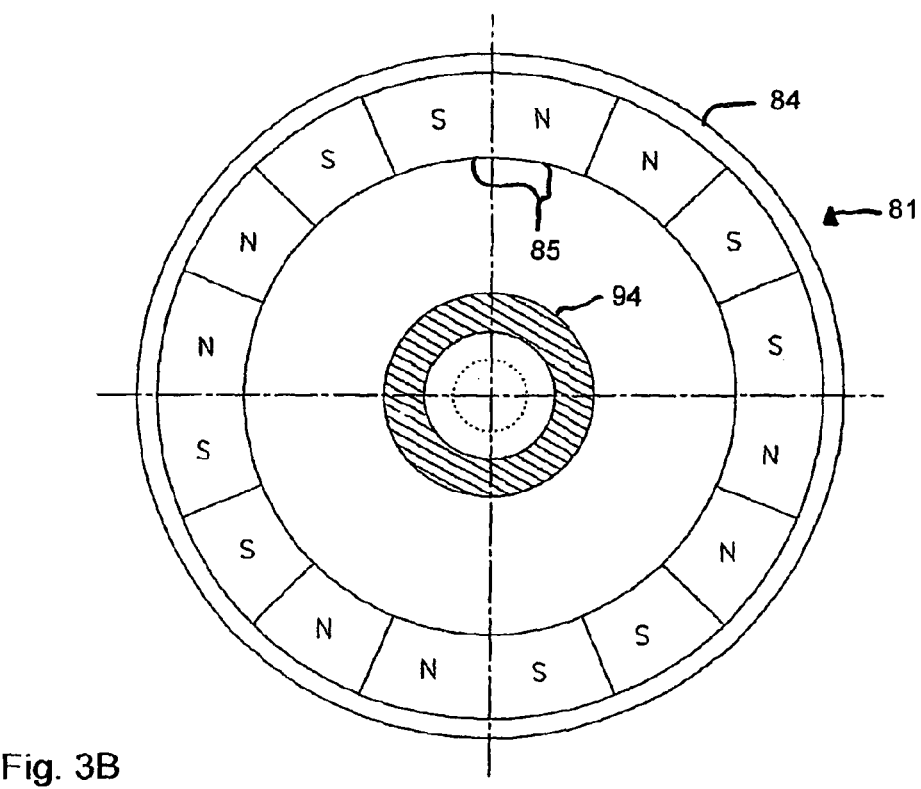
FIG. 3B is a schematic plan view of one rotor half of the brushless motor-generator in FIG. 3A in accordance with the invention.

Turning now to FIGS. 3A and 3B, a brushless motor-generator 80 includes a rotor 81 mounted for rotation relative to a stator 82. The rotor 81 has two steel rotor portions 83 and 84 that are connected together with a high reluctance connection tube 94. The tube 94 and rotor portions 83, 84 may include fan air moving features to provide air flow in the motor-generator 80 for cooling, if desired. As shown in FIG. 3B, multiple circumferentially alternating permanent magnets 85, 86 are attached to each rotor portion 83, 84 to drive magnetic flux across a magnetic airgap 87 defined between axially facing surfaces of the two rotor portions 83, 84. Located in the magnetic airgap 87 is a special air core armature 88 that has multiple windings for conversion of power. Several configurations of the armature 88 are described in more detail below. The rotor portions 84, 83 have shafts 89 and 90 that are journalled in bearings 91, 92. The bearings 91, 92 are supported by housing end plates 95, 96 that are held in spaced-apart position by an outer tube 97. Bolts 98 hold the end plates 95, 96 together and also support the air core armature 88 within the magnetic airgap 87. The axial plan view of half of the rotor 81, shown in FIG. 3B, shows the rotor portion 84 with multiple magnets 85 that drive flux back and forth across the magnetic airgap 87 and circumferentially through flux paths in the rotor portions 83, 84, as noted in FIG. 1D.

Prior air core motor-generator designs have attempted to maximize the winding density of the air core armature. In motor-generators of similar design, increasing the volume of windings per magnetic airgap thickness increases the efficiency and power capability per unit amount of magnet material. Although air core armatures made in accordance with this invention achieve a reasonably high winding density, another goal is make the armature manufacturing several times faster, easier and more cost effective.

Figure 4:
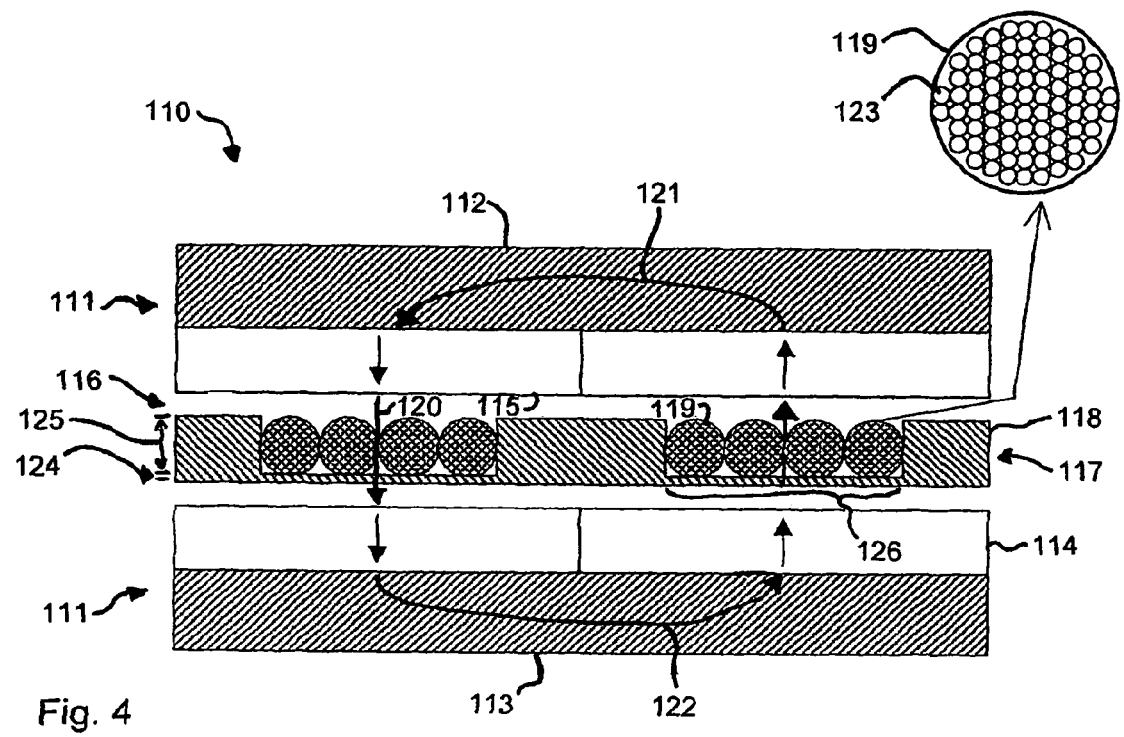
FIG. 4 is a schematic partial elevation of a radial view of a circumferential section of a brushless permanent magnet motor-generator in accordance with the invention.

A radial view of a circumferential section of a brushless motor-generator 110 of the type shown in FIG. 3 is shown in FIG. 4. The motor-generator 110 includes a rotor 111 mounted for rotation about a vertical axis extending behind the plane of the figure, and an armature 117, in the position of the armature 88 in FIG. 3A. The rotor 111, like the rotor 81 in FIG. 3A, has spaced apart ferromagnetic rotor portions 112, 113 onto which are attached multiple alternating polarity permanent magnets 114, 115. An axial airgap 116 is defined between opposing faces of the magnets 114, 115. The magnets drive flux 120 across the airgap 116 and through the armature 117, which is fixed in the airgap 116. The magnetic flux passes circumferentially through loops 121, 122 in the ferromagnetic rotor portions 112, 113 to complete the flux loop. The armature 117 is constructed of a form 118 made of a substantially nonmagnetic and low electrical conductivity material, such as nylon or other plastic or ceramic, selected to provide the strength and temperature capability needed for the particular size and application of motor-generator. It may preferably be thermal conducting to facilitate heat transfer out of the armature 117. The form 118 has a thin backing 124 and thicker raised portions 125. The spaces between the raised portions 125 form channels 126.

The armature is fabricated by winding the windings 119 directly into the spaces or channels 126 in the form 117. In a preferred embodiment, the width of the channels 126 is made to tightly fit the windings 119 such that the winding process is completed by simply pushing the windings 119 into the channels 126.

As illustrated, the armature construction does not maximize the winding density, as is also the case with previous methods. The form backing 124 and raised portions 125 occupy some space that might otherwise be able to hold more windings in the absence of the form 117. However, the armature manufacturing process is made much simpler, faster and more reliable. No wires need be threaded and pulled through multiple openings during winding, no specialized holding and potting equipment is required and potting resins can be eliminated or minimized, although potting resins may be sometimes be used to hold the windings in place after winding. Unlike armature fabrication, wherein coils are separately wound and later assembled and potted together, armatures in accordance with this invention can be manufactured in a reduced number of simpler steps. Likewise, the use of the form 117 and similar such forms disclosed herein allows use of Litz wire. Litz wire is wire comprised of multiple individually insulated strands 123, illustrated schematically in FIG. 4A. The insulation between strands precludes development of significant eddy current losses in the windings. Use of Litz wire becomes significantly important for higher power motor-generators where the wire size and armature size become large. It is especially advantageous for use in motor-generators designed to replace large induction motors. Winding with Litz wire provides the additional benefit of easier wire bending in the wire process. However, unlike solid wire conductors, the Litz wire does not hold its shape to which it is bent. Therefore, winding air core armatures with Litz wire by previous separately wound methods is difficult. The windings or coils do not maintain shape after winding and while being assembled. The process disclosed herein overcomes this deficiency because the channels hold the wires, and the process is completed quickly and simply.

Figure 5:
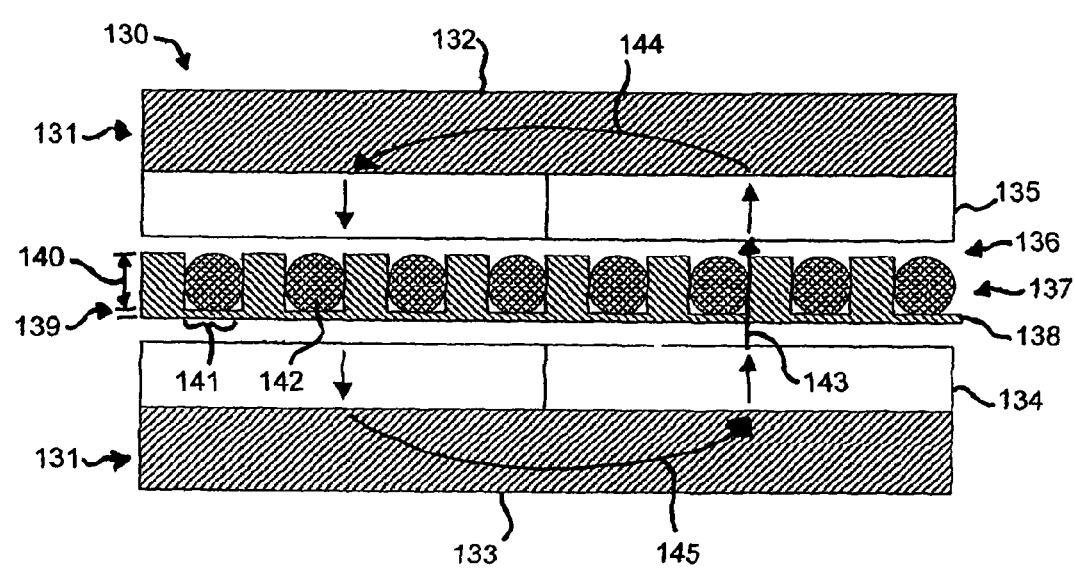
FIG. 5 is a schematic partial radial elevation along a circumferential section of another configuration brushless permanent magnet motor-generator in accordance with the invention.

Another configuration brushless motor-generator 130, shown in FIG. 5, is similar to the configuration shown in FIG. 4 in that it includes a fixed stator, including an armature 137, and a rotor 131 having two spaced apart co-rotating steel rotor portions 132, 133 with attached magnets 134, 135. The armature 137 is fixed in an axial airgap 136 defined between opposing faces of magnets 134, 135. The magnets 134, 135 drive magnetic flux 143 across the armature airgap 136 and through the armature 137 in the airgap 136, and through circumferential paths 132, 133 in the rotor 131, as in FIGS. 3A and 4.

Figure 9:
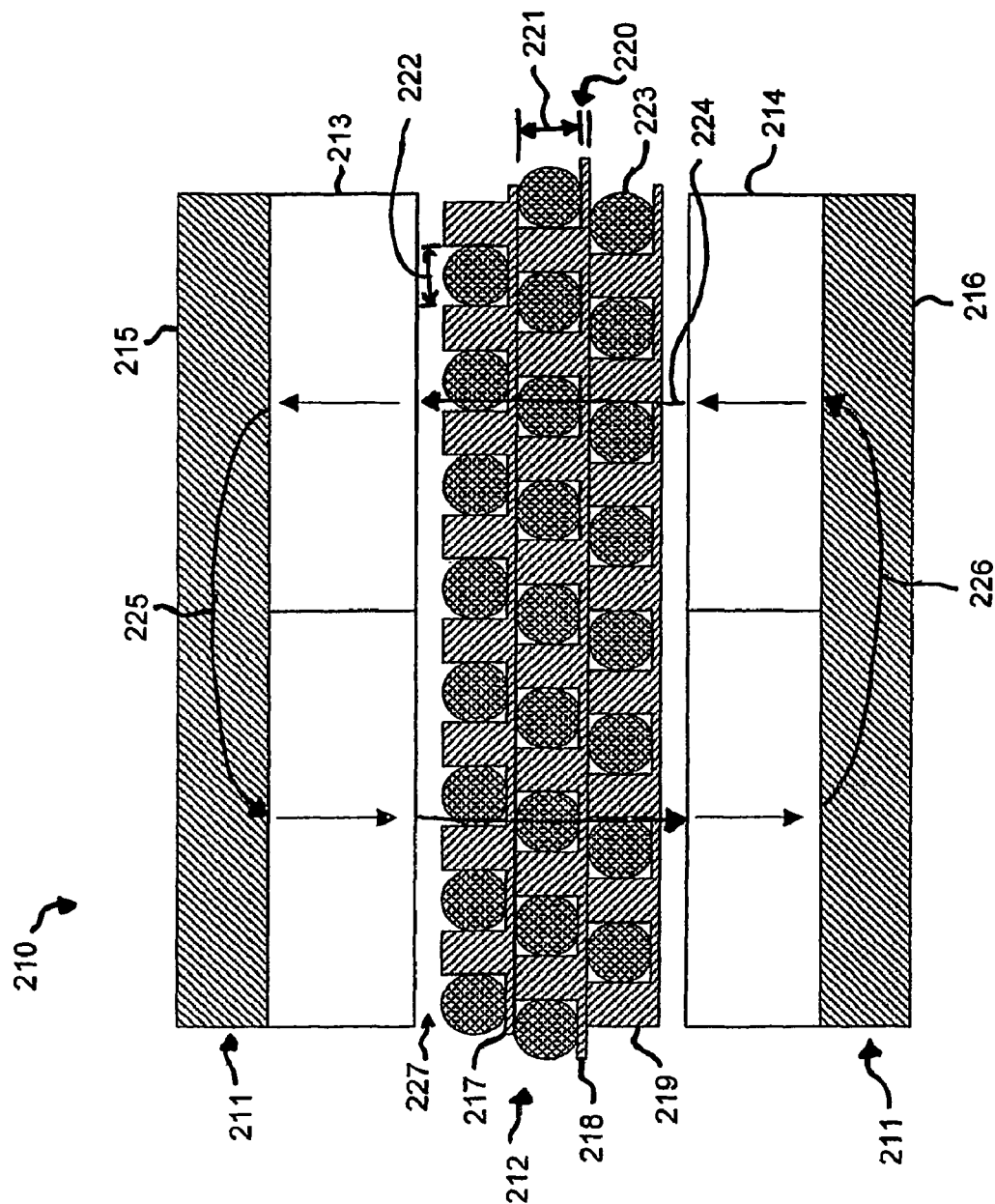
FIG. 9 is a schematic partial elevation of a radial view of a circumferential section of a second alternate configuration brushless permanent magnet motor-generator in accordance with the invention.
Figure 21:
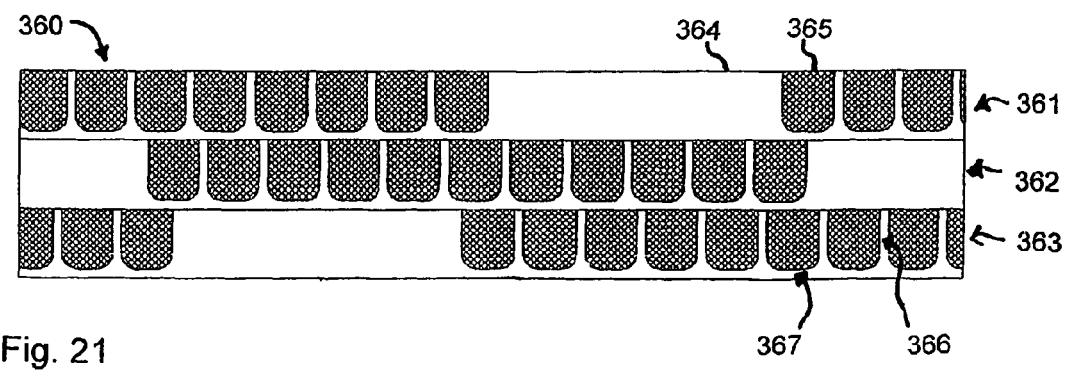
FIG. 21 is a developed schematic elevation of the phase stacking of the armature winding of FIG. 20 to produce an armature for a three-phase motor-generator in accordance with the invention.

The armature 137 includes a substantially nonmagnetic and low electrical conductivity form 138 with a thin backing 139 and channels 141 between raised portions 140. In this configuration, the winding is further facilitated and the windings 142 are held more securely in the channels 141 which are of a width approximately equal to the width of the wire of the windings 142 such that each wire is placed in a separate channel. When multiple wires are run in a single channel, as shown in FIG. 4, the group of wires can tend to bow upward and loose shape and support from the channel, and hence come out of the channel, although this tendency can be counteracted by covering the wire-filled channels with a bonded on cover plate or another form, as shown in FIGS. 9 and 21. Otherwise, uncovered wires in a multi-wire channel can make winding more difficult, especially when many wires are required for the armature winding. The configuration of FIG. 5 eliminates that problem and also provides other benefits to the winding pattern such as facilitating the winding of multiple wires electrically in series, as will be described in more detail later. When one wire occupies a single channel, winding can become easier and the wires have a greater tendency to stay in place, whether interference fit with the channel or loose. The wires 142 are illustrated as having a diameter equal to the width of the channels 142, but they can also be sized with a diameter greater than the width of the channel 142 so that they must be pressed into the channel, as described below in connection with FIG. 11, and fill the channel completely, as shown in FIG. 21. Alternatively, the wires can be preformed with a square or rectangular cross-section so they fit snuggly into the channel. Also, for manufacturing convenience, the wires can be preformed with a slightly tapering profile so they can be inserted easily into the channel and then fill the channel completely when pressed therein.

Figure 6:
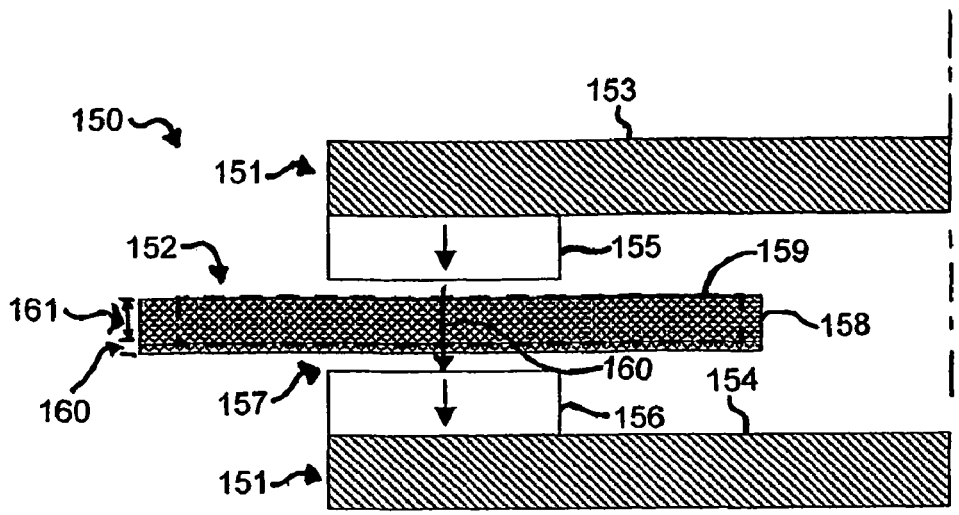
FIG. 6 is a schematic partial elevation, looking in the circumferential direction at a radial section, of a brushless permanent magnet motor-generator in accordance with the invention.

As shown in FIG. 6, one side of a brushless motor-generator 150 has a rotor 151 mounted for rotation about a vertical axis, and a stationary stator 152. The rotor 151 comprises two spaced apart co-rotating steel portions 153, 154 with attached magnets 155, 156 that drive magnetic flux 160 across an armature magnetic airgap 157, as illustrated in FIGS. 3A-5. The stator 152 is comprised of a substantially nonmagnetic and low electrical conductivity form 158 that has a thin backing 160 and thicker raised portions 161 that form channels on the surface, as illustrated in FIG. 5. Windings 159 are wound directly onto the form 158 in the channels between the raised portions 161. As shown in this configuration, the windings 159 are completely contained within the channels between the raised portions 161 and are supported for all portions of the windings 159, including the end turns, as further illustrated in FIG. 22. This provides high structural support and ease of winding, but may slightly increase the cost of the form 158.

Figure 7:
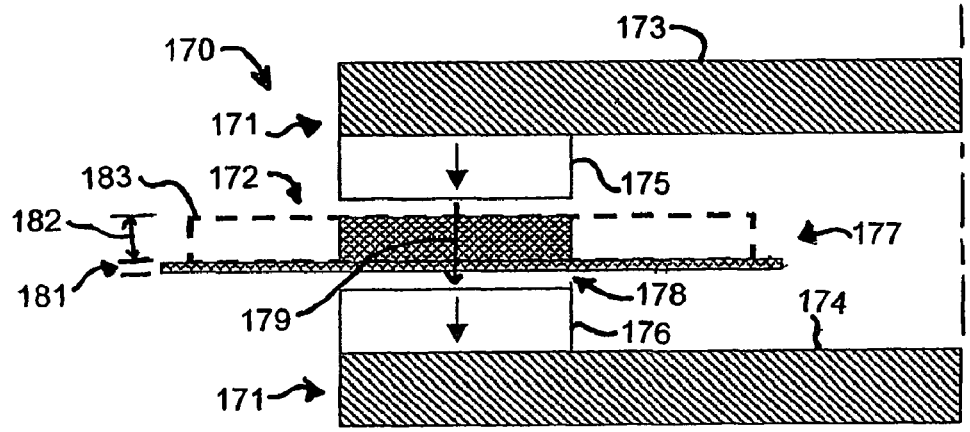
FIG. 7 is a schematic partial elevation of a circumferential view of a radial section of an alternate configuration brushless permanent magnet motor-generator in accordance with the invention.

In some applications of motors in accordance with this invention, the form need not support the windings at all portions of the winding on the form. It may be desirable to reduce the form cost or simplify manufacturing by supporting the windings only in selected places, although it is preferable to provide enough support to hold the windings in place and ensure easy winding. Leaving a portion of the winding on the form unsupported by channels can also allow for cooling of the windings, or potting after winding. Potting with high thermal conductivity material may be beneficial for a specific motor-generator application. A brushless motor-generator 170 having a winding form 177 with channels supporting the windings only in the active lengths is shown in FIG. 7. "Active lengths" as used herein means the lengths of the armature windings that interact with flux in the airgap to produce torque in a motor, or electrical power in a generator. The motor-generator 170 has a rotor 171 supported for rotation about a vertical axis, as shown on the right side of the drawing in FIGS. 6-8, and a stator 172. The rotor 171 comprises two spaced apart co-rotating steel portions 173, 174 with magnets 175, 176 that drive magnetic flux 180 across the armature magnetic airgap 178, as illustrated in FIGS. 3A-5. The stator 172 includes a substantially nonmagnetic and low electrical conductivity form 177 that has a thin backing 181 and thicker raised portions 182 that form channels on the surface. Windings 183 are wound directly onto the form 177 in the channels. In this configuration, the raised portions 182 bounding the sides of the channels hold only the active length portion of the windings. The end turns of the windings are free and can be exposed to air-cooling if desired. Without end turn channels, windings of multiple phases, angularly displaced by several channels per phase can also be wound on to a single form. This uses a number of wires divisible by three and is a more complicated winding and than using individual forms, but can reduce the required airgap thickness for multiple phases.

Figure 8:
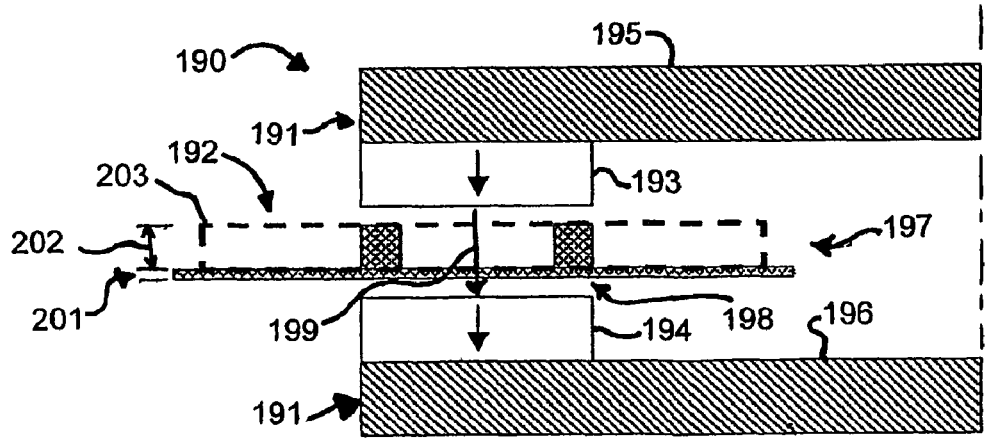
FIG. 8 is a schematic partial elevation of a circumferential view of a radial section of a second alternate configuration brushless permanent magnet motor-generator in accordance with the invention.

Another configuration of a brushless motor-generator, shown in FIG. 8, likewise has a rotor 191, mounted for rotation about a vertical axis, and a stator 192. The rotor 191 comprises two spaced apart co-rotating steel portions 195, 196 with magnets 193, 194 that drive magnetic flux 199 across an armature magnetic airgap 198, as illustrated in FIGS. 3A-5. The stator 192 includes a substantially nonmagnetic and low electrical conductivity form 197 that has a thin backing 201 and thicker raised portions 202 that form channels on the surface. Armature windings 203 are wound directly into the channels on the form 197. As shown in this configuration, the channels 202 only hold the wires 203 near the ends of the active lengths or magnetic airgap 198. This configuration provides less structural support but still facilitates winding by holding the windings in place during the winding process. Such a construction could be utilized when potting of the wires with epoxy, if desired. Thermally conductive epoxy can be useful to minimize heat build-up in the armature.

One of the benefits of the use of armature forms in accordance with this invention is the ability to simply and rapidly construct air core armatures. Although it is possible to wind multiple phases on a single form in some cases, this makes winding more difficult, and it makes the holding of the windings in the channels more difficult as well. To overcome these deficiencies and to make motor-generator manufacturing easier, multiple phases can be wound using multiple forms, such that each phase is wound on a separate form, and the separately-wounded forms and phases are then stacked together to form a multiphase armature, as shown in a brushless motor-generator 210 in FIG. 9. In this way, only one configuration of winding is needed. Each form is identical and is rotationally offset 120 degrees when stacking a three-phase armature. The number of wires per phase can then be chosen independently to provide the optimum power capability and efficiency for the motor-generator. This construction has the disadvantage of requiring multiple forms and an lower armature winding density. Such a construction would not typically be considered desirable However, when the cost savings in the armature manufacturing are considered, it has been found to be an advantageous construction.

The motor-generator 210 is comprised of a rotor 211, mounted for rotation about a vertical axis (out of the plane of FIG. 9), and a stationary stator 212. The rotor 211 has two spaced apart co-rotating steel rotor portions 215, 216 with magnets 213, 214 that drive magnetic flux 224 across an armature magnetic airgap 227 and in circumferential paths 225, 226 through the rotor portions 215, 216, as in FIGS. 3A-5. The stator 212 is comprised of a triple stack of armature forms 217, 218, 219. Each form contains a thin backing 220 and raised portions 221 that form channels 222. Windings 223 are wound into the channels 222, as previously described for FIGS. 4-8, and then the forms 217, 218, 219 are stacked and attached together at the proper angular orientation to each other for correct phasing to form a complete armature for the stator 212.

Figure 10A:
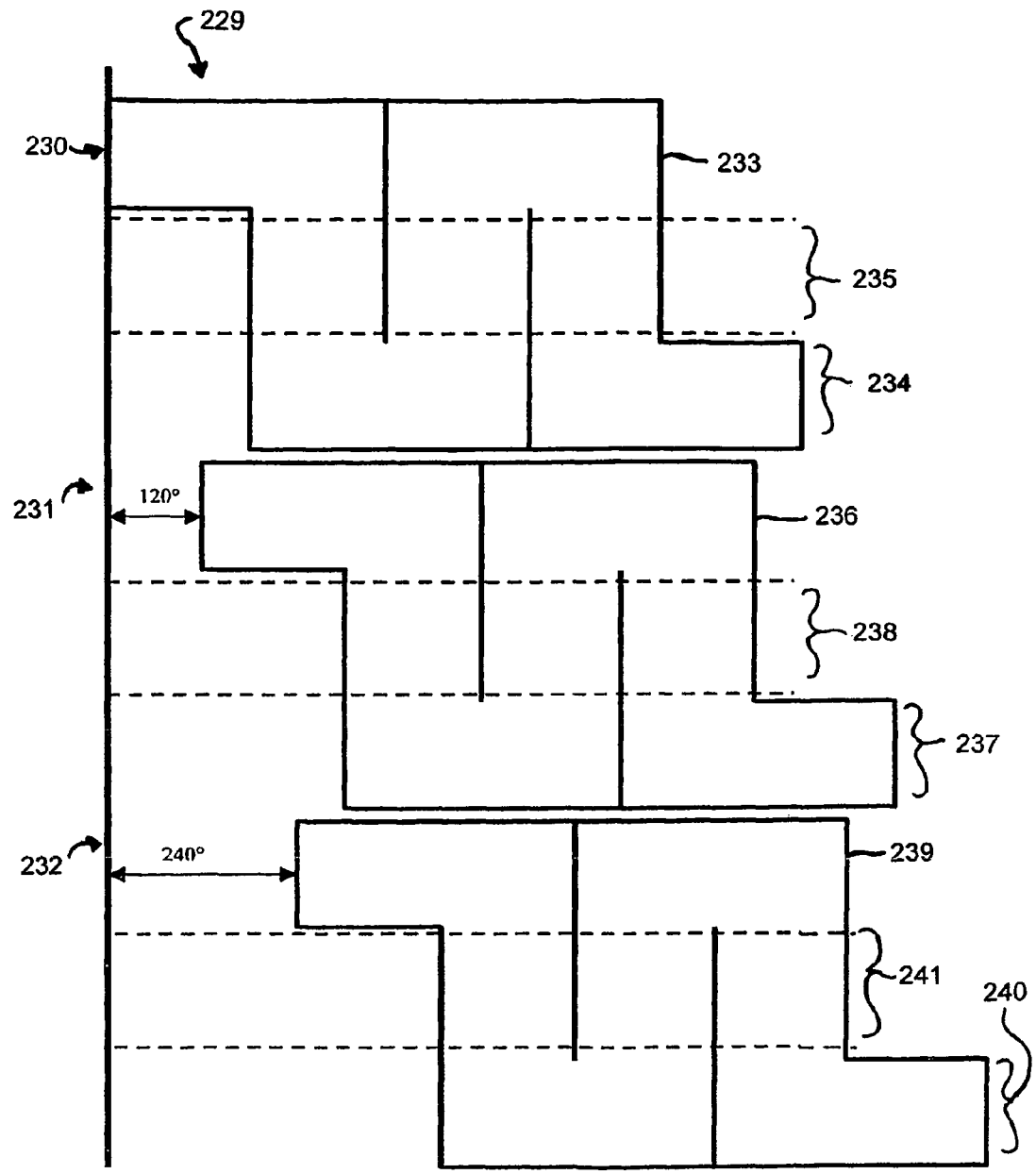
FIG. 10A is a schematic drawing of the phase stacking of the armature of brushless motor-generator in FIG. 9.
Figure 10B:
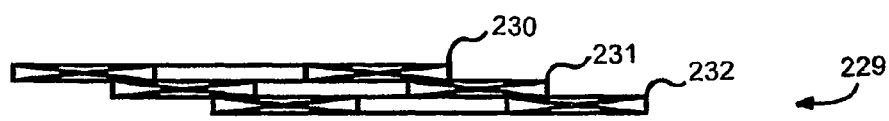
FIG. 10B is a schematic drawing of the phase stacking of the armature of brushless motor-generator in FIG. 9.

The phase stacking of the armature of the brushless motor-generator in FIG. 9 is shown in FIGS. 10A and 10B. The armature windings stacking 229 is comprised of three phases 230, 231, 232 comprising windings 233, 236, 239. Each winding 233, 236, 239 has active lengths 235, 238, 241 located in the magnetic airgap for power conversion, and end turns 234, 237, 240 (and also end turns at the other end of the active lengths) that traverse circumferentially. The windings 233, 236, 239 are each circumferentially offset 120 degrees for production of three-phase power. The offset angle would be adjusted accordingly for other numbers of phases.

Figure 11:
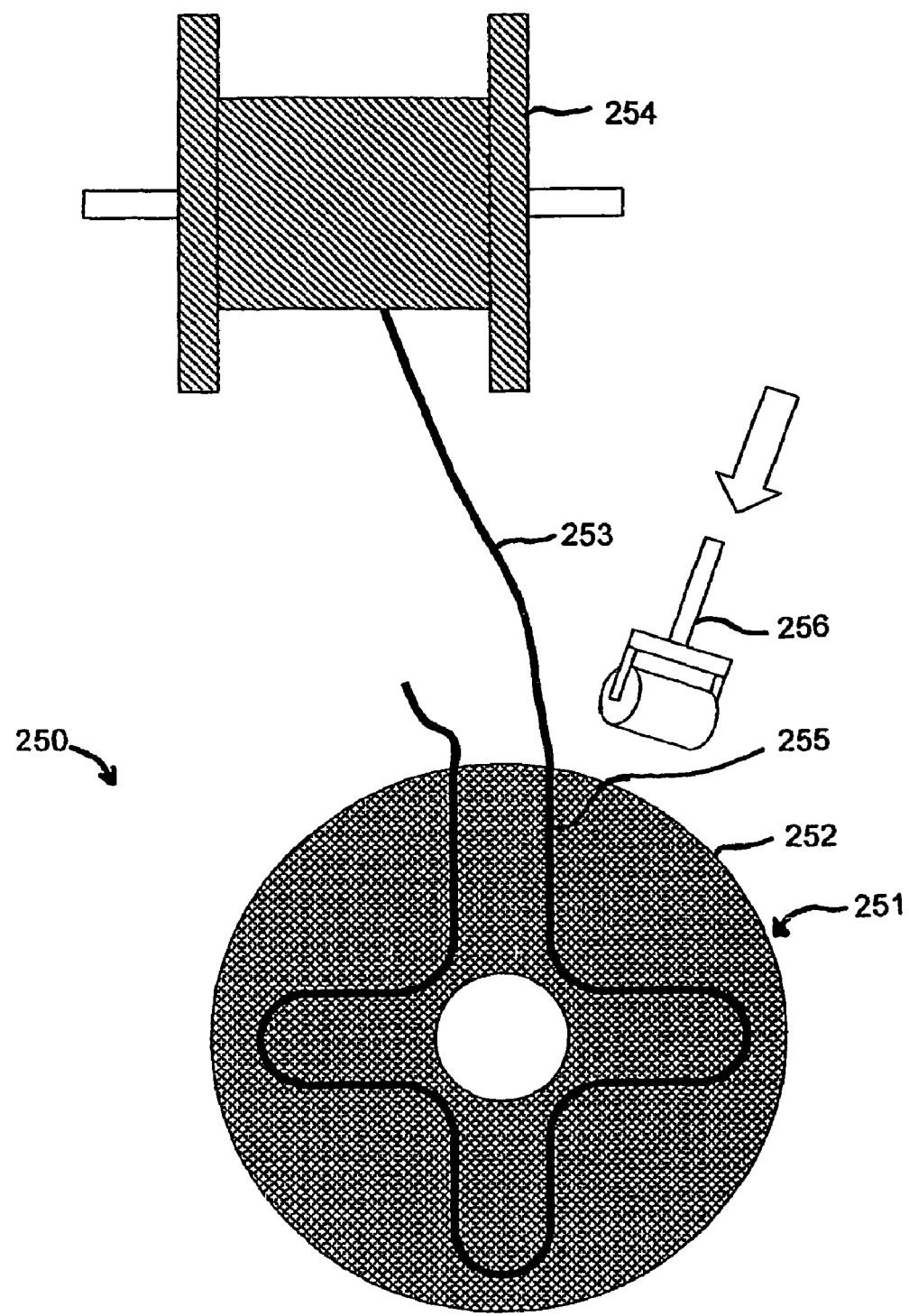
FIG. 11 is a schematic plan view illustrating a process to manufacture the armature of brushless motor-generators in accordance with the invention.

A process to manufacture the armature of brushless motor-generators in accordance with the invention is illustrated in simplified form in FIG. 11. The winding process of the armature forms could be automated if desired. However, one benefit of the invention is that the armature can be fabricated easily by hand as well. This allows armature manufacturing in relatively low volume to be cost effective, or manufacturing by hand in geographical regions where labor cost is low, so no significant capital equipment investment is required, a substantial contrast from other air core armatures. The process illustrated in FIG. 11 for manufacturing an armature 251 comprises pushing Litz wire 253 into channels 255 on the low electrical conductivity form 252, such as the form shown in more detail in FIG. 20. The wire 253 can be directly fed from its spool 254 and pressed into the channels in the form 252 with a roller 256. The compression of the wire into the channel can be such that, after the wire has been pressed into the channel, it is squeezed or clamped by the sides of the channel, holding the wire firmly in place. Depending on the required windings for a given motor-generator, a single wire 253 can be run around the form 252 one, or more typically, multiple times. Alternatively, multiple spools can feed wire into multiple channels at the same time, running wires physically in parallel. Such a configuration minimizes winding time, however some addition time may be required for electrical connections between the multiple wires.

After winding the forms, they may be assembled into the motors and attached in place within the rotor. Alternatively, if potting is desired, after winding they may be removed to a potting station where the potting operations are performed. Separation of the winding operation and the potting operations can be beneficial in manufacturing operations. Potting of multiple forms at once can be done by applying the potting compound to multiple wound forms, stacking multiple armature stacks together with a release film between the stacks, and enclosing the entire stack in a vacuum bag for evacuation of any air bubbles in the channels. Use of a heated chamber or autoclave can increase throughput and manufacturing consistency. The top form in a multi-form stack may be covered with a thin sheet, such as fiberglass or the like, to further ensure that the windings stay in place during operation of the motor-generator.

Figure 12:
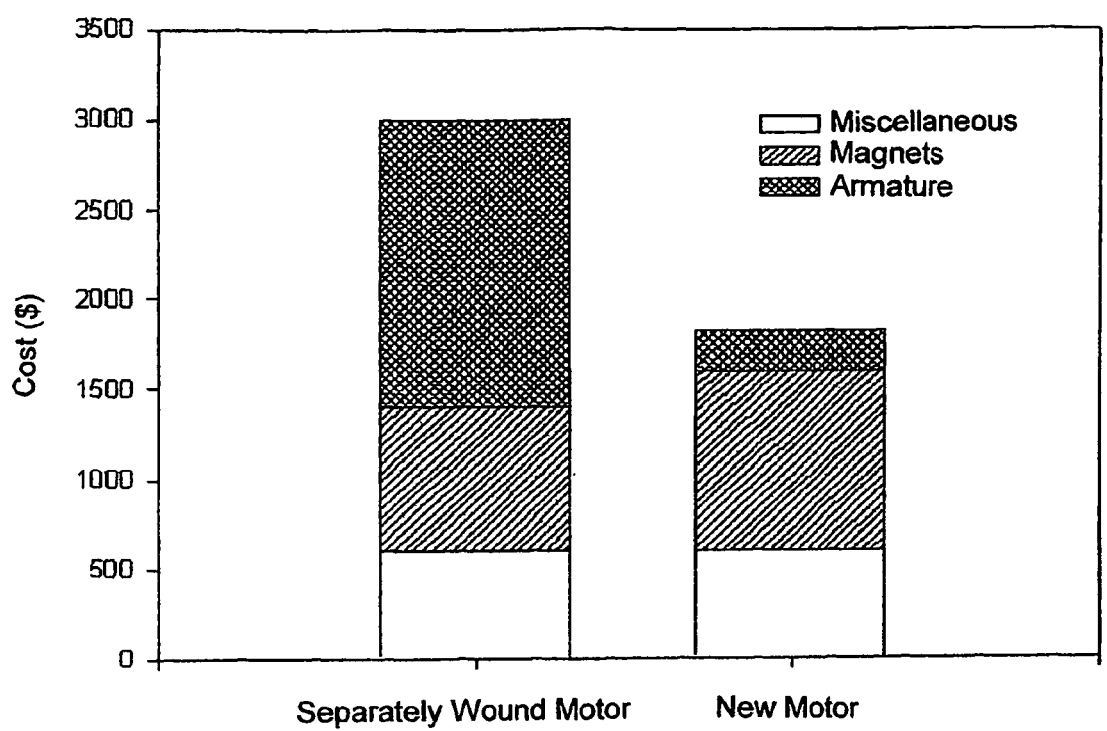
FIG. 12 is a graph comparing manufacturing costs for separately wound motor and a brushless motor-generator in accordance with the invention.

As noted previously, air core motor-generator designers have typically sought to maximize armature winding density in order to maximize the power capability and efficiency for a given amount of expensive permanent magnet material, with manufacturing ease a secondary concern. This allowed the greatest cost effectiveness for the rotor magnets. Contrary to this conventional approach, a benefit of this invention is to enhance armature manufacturing speed, reliability, and economy. Although achieving a high winding density is desirable, improved manufacturing ease and economy have been found to be achievable, so that the total manufacturing cost is lower. When looking at the manufacturing cost breakdown for moderate volume, the cost savings afforded by manufacturing motors in accordance with the invention become apparent. The manufacturing cost breakdown for 40 Hp motors of equivalent efficiency are shown in FIG. 12. Other size motors, such as much smaller motors, and other manufacturing volumes, such a very high volume, would have a different comparison. The chart compares a conventional separately wound motor wherein the coils are separately wound and later assembled and potted, with a motor made in accordance with the invention utilizing a form wound armature with wire channels. What can be seen is that the new motor requires approximately 20% higher magnet costs due to a lower winding density from the inclusion of the form backing and space from the raised channel portions. Despite the increased magnet costs, the new motor provides a roughly 40% cost reduction for the total manufacturing cost due to the much easier and more rapid armature manufacturing. Another factor in the armature cost savings is the reduction of capital equipment costs for manufacture, which is particularly advantageous for manufacturing of new larger air core motor-generators such as those greater than several horsepower. The new motors are also particularly well suited to compete with low cost induction motors for widespread industrial applications.

Figure 13:
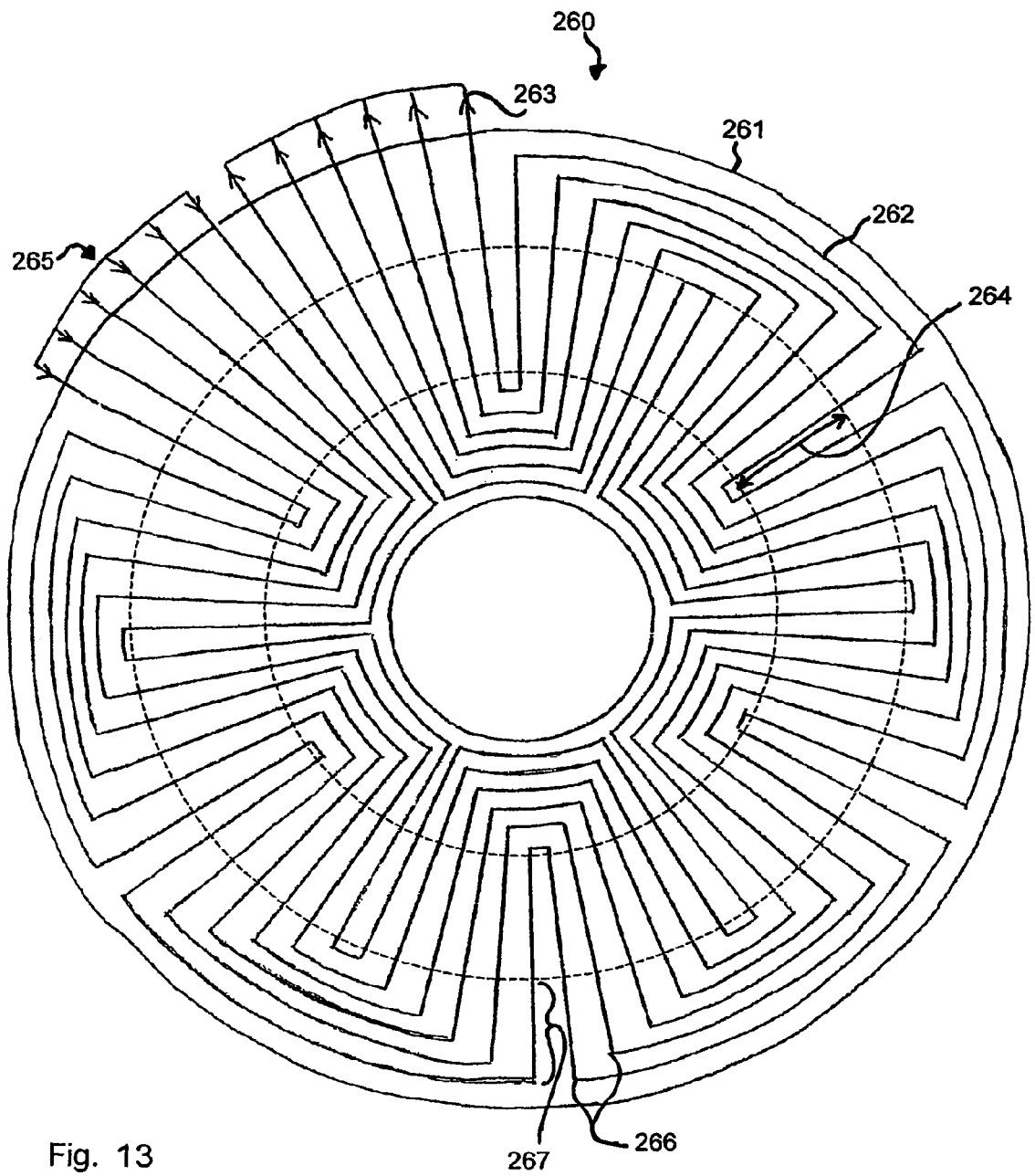
FIG. 13 is a schematic plan view of an armature winding for a brushless motor-generator in accordance with the invention.
Figure 20:
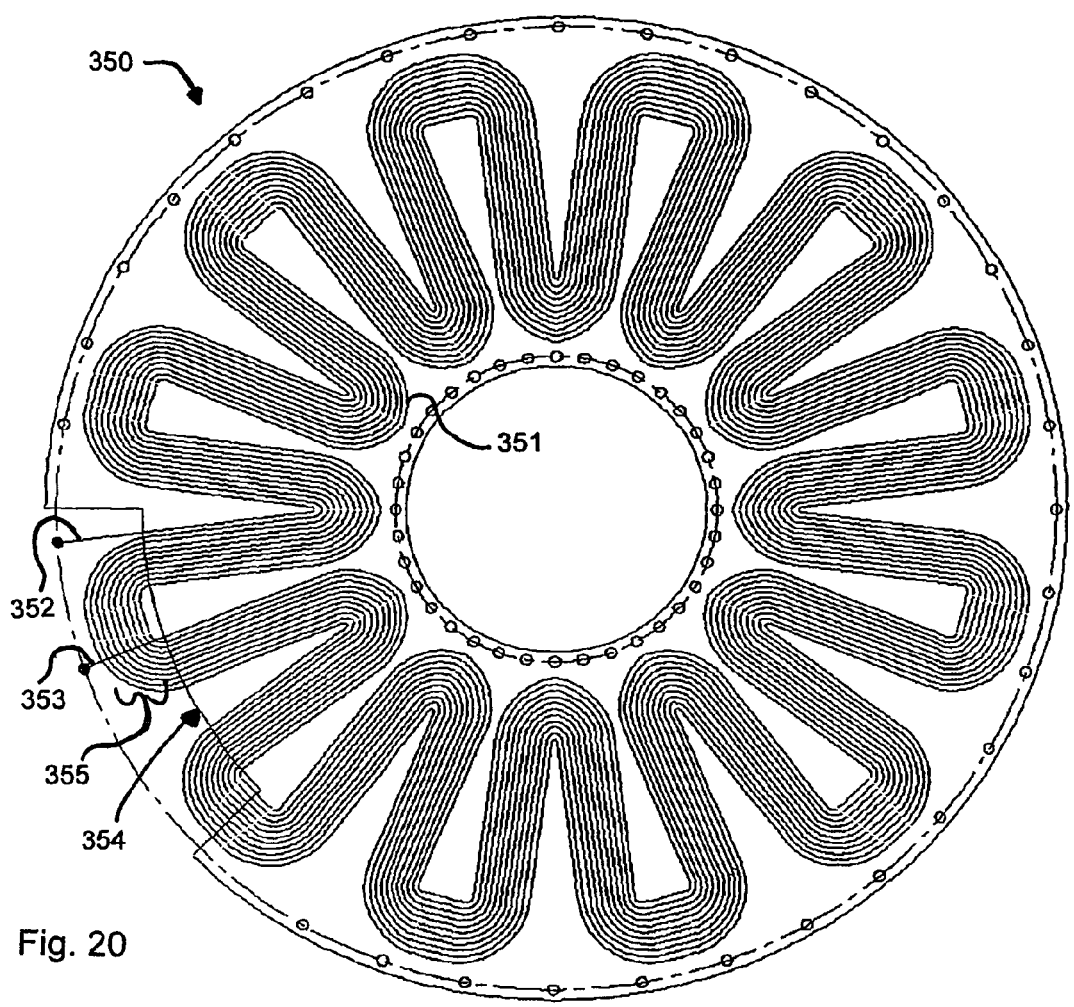
FIG. 20 is a schematic plan view of a third alternate configuration armature winding for an axial gap brushless motor generator in accordance with the invention.
Figure 22:
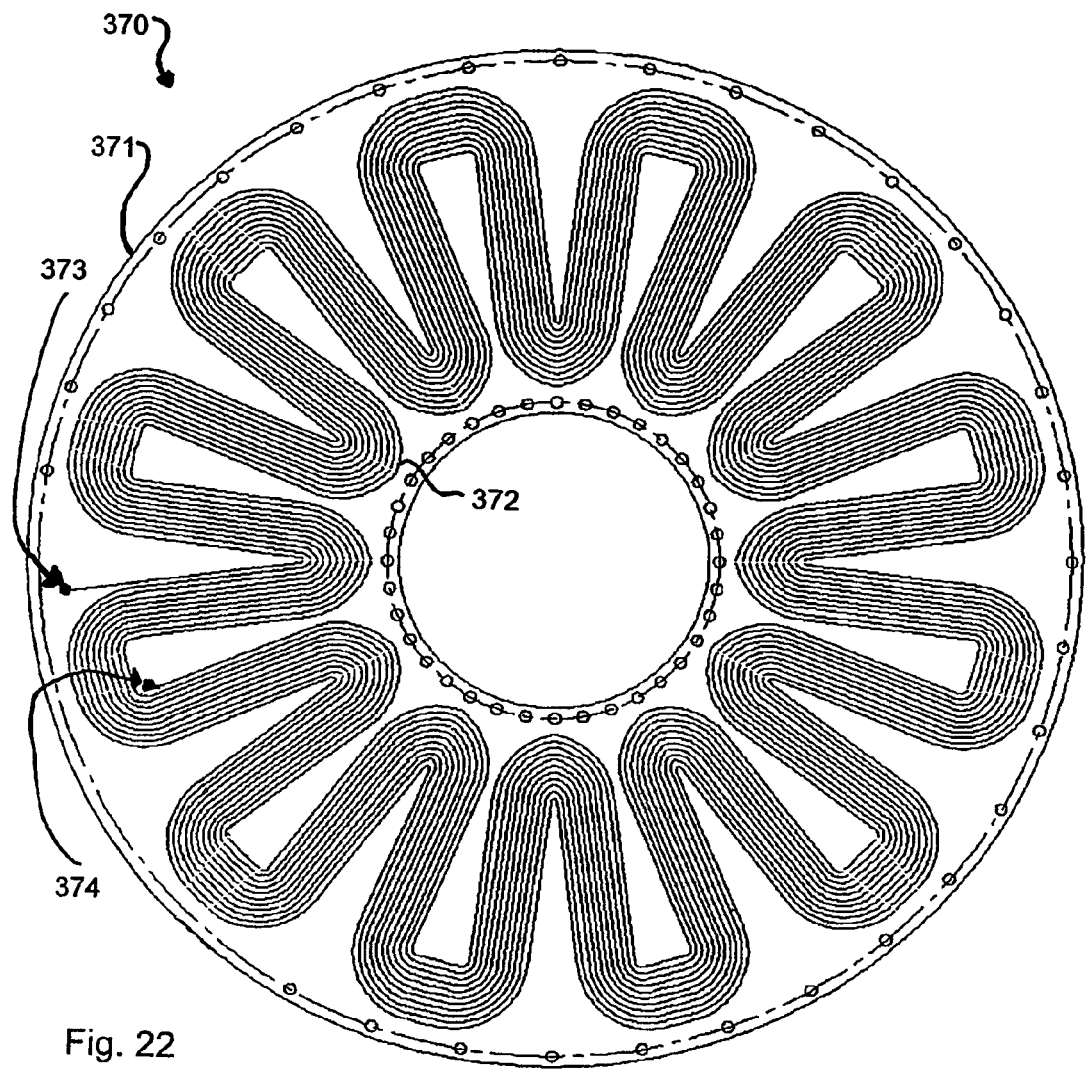
FIG. 22 is a schematic plan view of a fourth alternate configuration armature winding for a brushless motor generator in accordance with the invention.

An armature winding for a brushless motor-generator, such as the one shown in FIG. 3A, is shown schematically in FIG. 13. The armature 260 has a substantially nonmagnetic and low electrical conductivity form 261 with wire channels 262 in the surface. Wires 263 are wound into the channels 262. The wires 263 and the channels 262 are shown using the same lines in FIG. 13 for simplicity and clarity of illustration. In the configuration shown, the wires 263 are wound in a serpentine path around the circumference with all the wires in parallel. Such a configuration is applicable for use in high power motor-generators. In the parallel serpentine configuration, no winding overlapping of the wires 263 is required, providing a significant advantage. The winding of the wires 263 into the channels 262 is also very easy and can be completed rapidly, and there is no overlapping of wires. The wires 262 have active lengths 264 that traverse non-circumferentially (radially, as shown in FIG. 13) across the magnetic airgap (shown as the annular zone between the dashed lines 268 and 269) and also inner and outer end turns 267 that traverse circumferentially. The end turns 267 are preferably located outside the magnetic airgap in order to maximize the power conversion per amount of magnet material. It is also possible to have some end turns located in the magnetic airgap, if desired, but with the result of less total active length conductor length in the magnetic airgap. The transitions between active lengths 264 and end turns 267 are shown as corners 266. The corners 266 can be rather sharp or more preferably are rounded, as shown in FIGS. 20 and 22, to facilitate keeping the wires 263 in the channels. The end turns may also be completely rounded from one active length to another.

Figure 14:
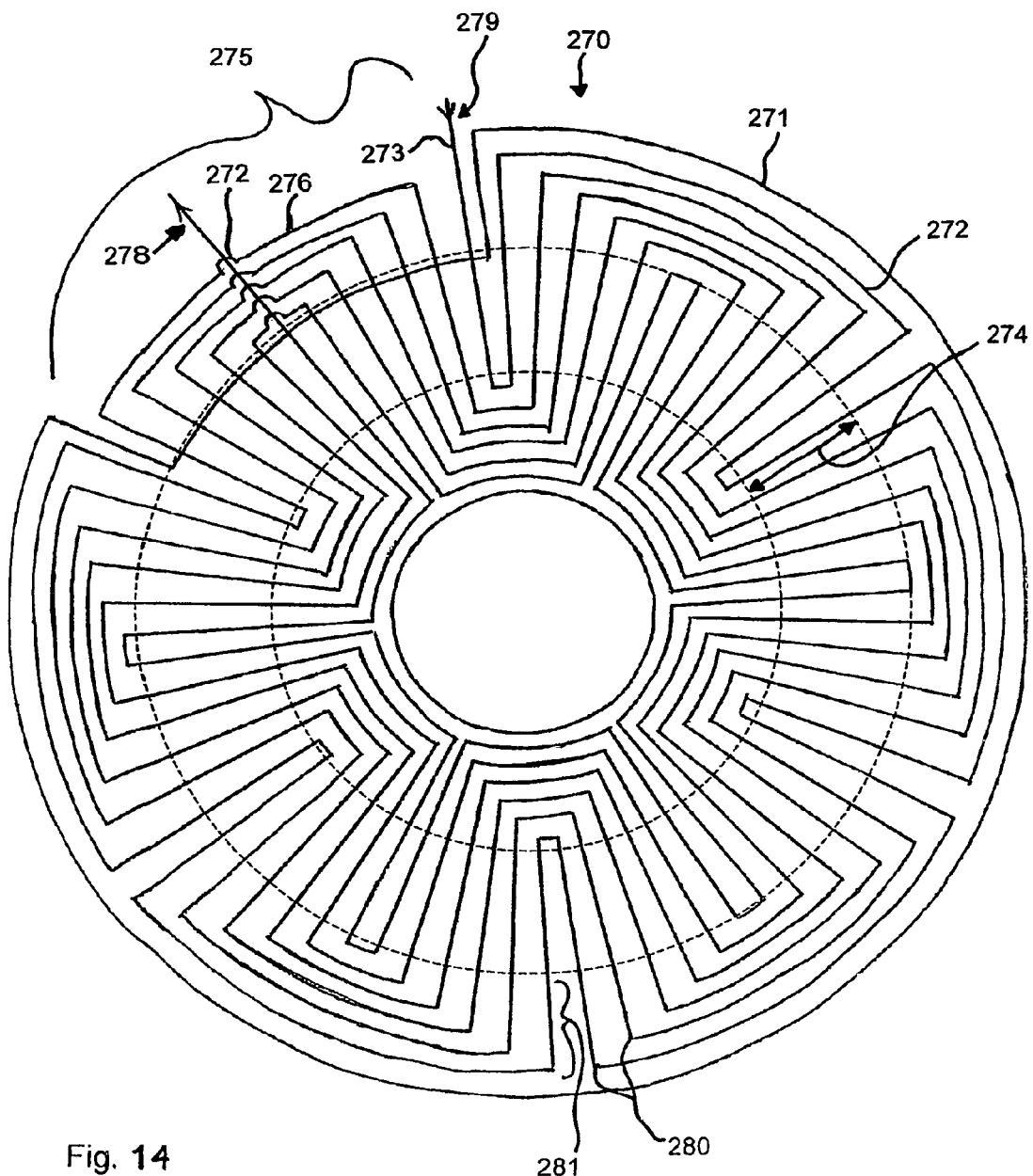
FIG. 14 is a schematic plan view of an alternate configuration armature winding for a brushless motor-generator in accordance with the invention.

Another wiring configuration for an armature 270 for a brushless motor-generator, such as the one shown in FIG. 3A, is shown in FIG. 14. The armature 270 includes a substantially nonmagnetic and low electrical conductivity form 271 with multiple surface channels 272. Wires 273 are wound onto the form 271 and into the channels 272. The wires 273 and the channels 272 are shown using the same lines in FIG. 14 for simplicity and clarity of illustration. The windings 273 have active lengths 274 in the magnetic airgap and have radially inner and outer end turns 281 that traverse predominately circumferentially, connecting active lengths together. In the winding configuration shown, the wire 273 is wound in a serpentine pattern in a single wire with multiple passes around the entire circumference of the form 271, or it may be made with multiple wires with serial electrical connection between adjacent wires. The winding may be done by winding multiple wires 273 with one pass around the circumference and then making electrical connections 276 between adjacent wires 273. Winding is rapid and easy by this process but more time is required for making the electrical connections and soldiering. Alternatively, if the form 271 has individual channels 272 for each wire, the entire winding process can be completely without the need for any electrical connections. The winding wire 273 is wound into the channels 272 and continues multiple times around the diameter of the form 271. Each pass results in placing the wire 273 in the next adjacent channel 272. Again, the winding corners 280 can be relatively sharp or alternatively rounded, as shown in FIGS. 20 and 22, for easier winding.

When winding multiple wires 273 in series, some overlapping of the wires 273 occurs, and the thickness of the armature 270 in the direction of the magnetic flux can increase and could interfere with stacking or assembling of multiple forms. To overcome this potential problem, preferably no backing portion of the form 271 is provided at circumferential positions where overlapping 272 of windings 273 occur on a single form. The form 271 has a section 275 omitted to allow for the overlapping. Because the diameter of the wire 273 is typically greater than the form backing, the same portions of successively stacked forms may also be removed as well. Alternatively, the Litz wire sheath could be removed and the individual wires spread out in a shallow layer, with a dielectric film or tape between the wire layers to insulate. The armature has an input wire connection 279 and output wire connection 278 when completed.

Figure 15:
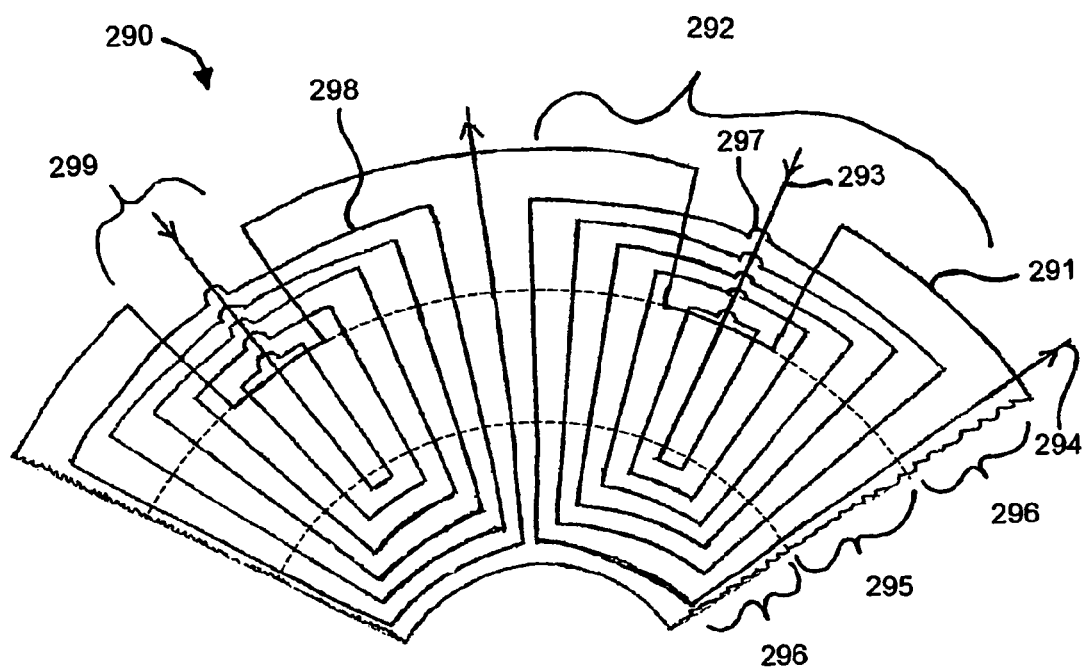
FIG. 15 is a schematic partial plan view of a second alternate configuration armature winding for a brushless motor-generator in accordance with the invention.

Although previously shown with serpentine pattern winding, the armature may also utilize a coil pattern winding. Coil pattern winding can allow for continuous serial winding around the circumference of the armature, without connections. However, coil winding has the drawback that it results in more positions of overlapping. An armature winding configuration for a brushless motor-generator using a coil winding pattern is shown in FIG. 15. The armature 290 includes a substantially nonmagnetic and low electrical conductivity form 291 with multiple channels 298 on the surface. Wires 293 are wound into the channels 298 in a pattern of multiple coils. The windings have active lengths 295 located in the magnetic airgap, and end turns 296 preferably located outside the magnetic airgap. Each coil 292 has a beginning end 293 and a terminal end 294. The terminal end of one coil can be wound directly into the beginning end of the next adjacent coil to speed winding manufacturing. Whether the coils 292 are connected in series or in parallel, overlapping 297 will occur. To allow for stacking or assembly of multiple forms, a cut out portion 299 is preferably made in the form 291. Multiple stacked forms would also have cut outs in the same locations when assembled to facilitate uniform stacking.

Figure 16:
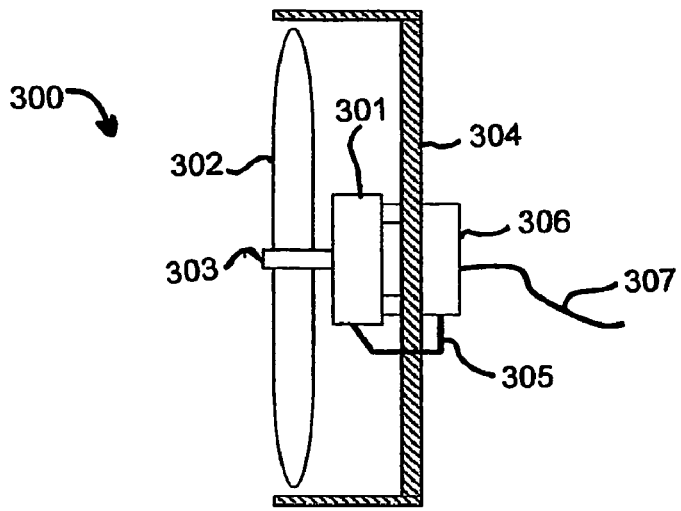
FIG. 16 is a schematic drawing of a fan with brushless motor-generator in accordance with the invention.

There are many promising applications for the disclosed motor-generator, due in part to its high efficiency at low cost and ability to be readily constructed to large power levels. Besides applications normally utilizing brushless DC motors, such as servomotors, motors in accordance with the invention using a suitable motor controller discussed below, can complete with variable speed induction motor systems. The advantage of higher efficiency allows it to provide considerable electricity cost savings particularly in applications that run continuously or near continuously. One such application is in fans and blowers for air circulation. Fans used in clean rooms, for instance, run continuously and move large volumes of air. They also consume a large amount of electrical power and result in substantial annual electricity costs. Motor-generators in accordance with the invention can replace these induction motor driven fans and provide a significant energy savings without a significant acquisition cost penalty. The low initial cost allows them to be competitive and a commercially attractive solution. An example of such an application is a fan 300 shown in FIG. 16 with a brushless motor in accordance with the invention. The fan 300 includes an air core permanent magnet motor generator 301 having a specialized armature construction as disclosed herein. The motor 301 drives a fan rotor 302 through connection to the shaft 303. The motor 301 is mounted to the fan frame housing 304. The armature wires 305 connect the motor 301 to a motor drive inverter 306. The inverter provides synchronous AC to the motor-generator 301 to synchronously energize the armature windings to apply torque to the rotor. The inverter 306 can be a sensor feedback type or alternately a sensorless type for motor commutation as described in conjunction with FIG. 24. The inverter 306 is connected to supply power through a power connection 307.

Figure 17:
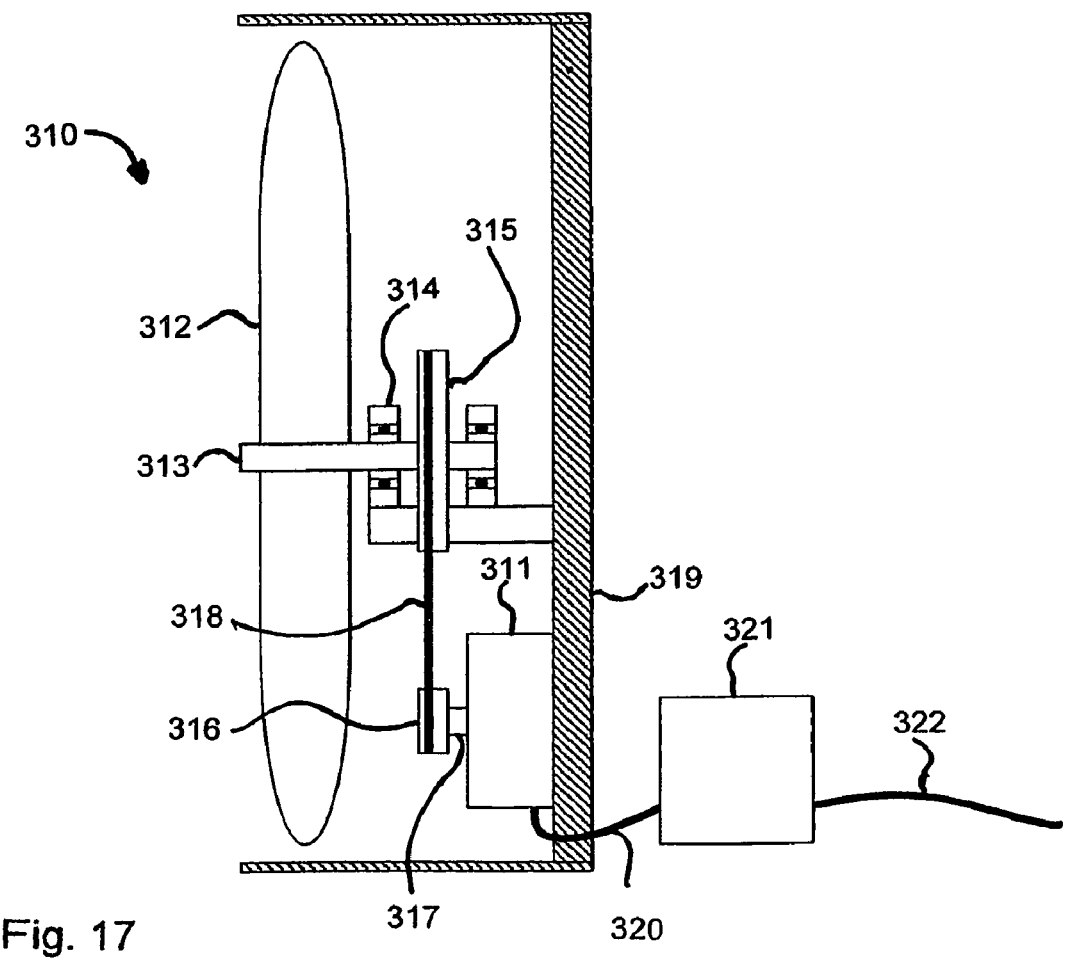
FIG. 17 is a schematic drawing of an alternate configuration fan with brushless motor-generator in accordance with the invention.

When moving large volumes of air, larger slow speed fans are typically utilized. In this case, a belt drive is interposed between the motor and a larger fan rotor to drive the fan at a speed lower than the motor speed. Such a configuration of a fan with a brushless motor-generator and speed reducer is shown in FIG. 17. The fan 310 includes a brushless air core motor 311 having a specialized armature construction as disclosed herein. The motor 311 drives a large diameter fan rotor 312 mounted on an intermediate shaft 313 that is journalled by bearings 314. The motor 311 drives the intermediate shaft 313 through pulleys 315, 316 and a v-belt 318. The armature windings of the motor 311 have an electrical connection 320 to a variable speed motor drive inverter 321. The inverter 321 provides variable frequency and synchronous AC power to the motor 311 to drive it at different speeds. The inverter 321 is powered by a connection to input line power 322.

Figure 18:
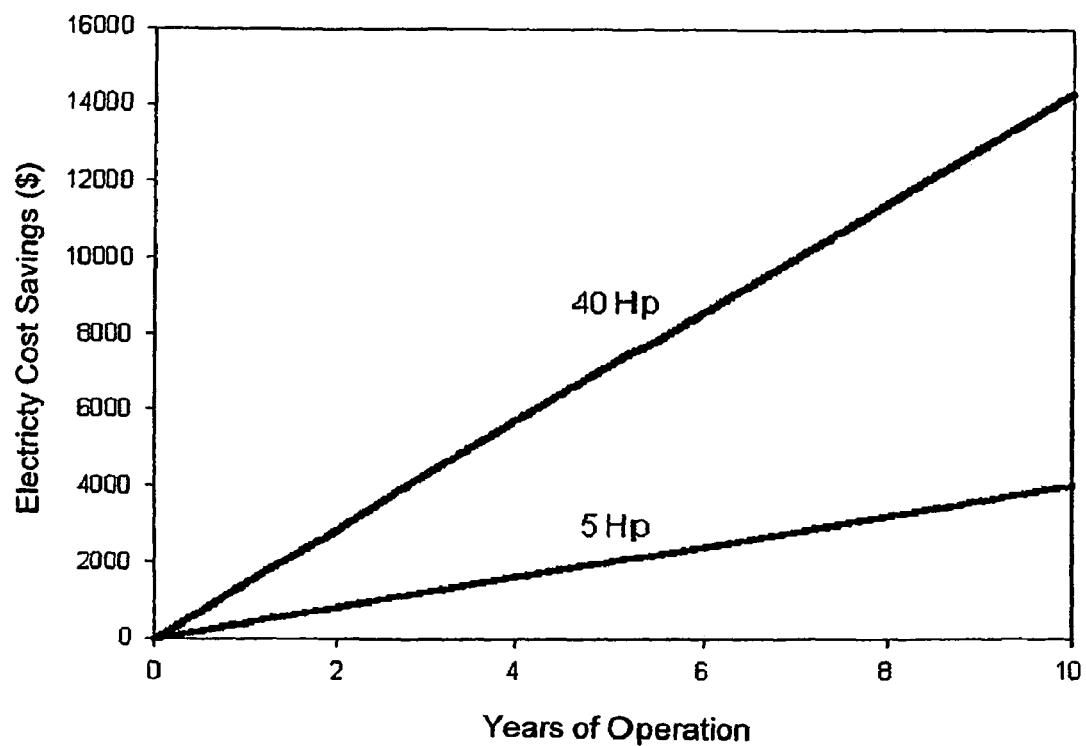
FIG. 18 is a graph illustrating the electricity cost savings from use of a motor in accordance with invention compared to standard induction motors.

The electricity cost savings from replacement of induction motors with the motor-generator invention can be substantial. An example of electricity cost savings from a motor in accordance with the invention over a standard induction motor is shown in FIG. 18. The calculation assumes continuous operation and the high efficiency EPACT rated induction motors for comparison with a new 98% efficient air core motor as disclosed herein. Two different motor sizes are shown, 5 Hp and 40 Hp. Each year, the new motor will save $400 for the 5 Hp size and $1,434 for the 40 Hp size. Over ten years, this translates to $4,000 and $14,340, respectively per each motor used.

Figure 19A:
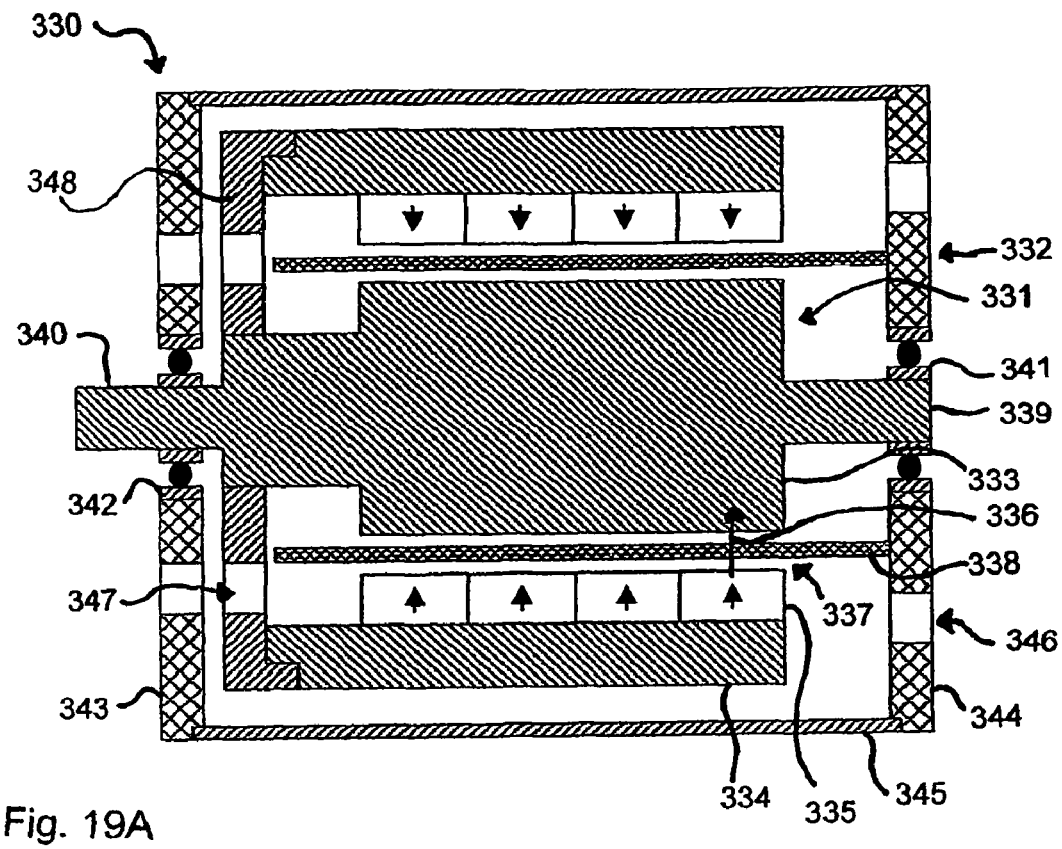
FIG. 19A is a schematic side elevation of a radial gap brushless permanent magnet motor-generator in accordance with the invention.
Figure 19B:
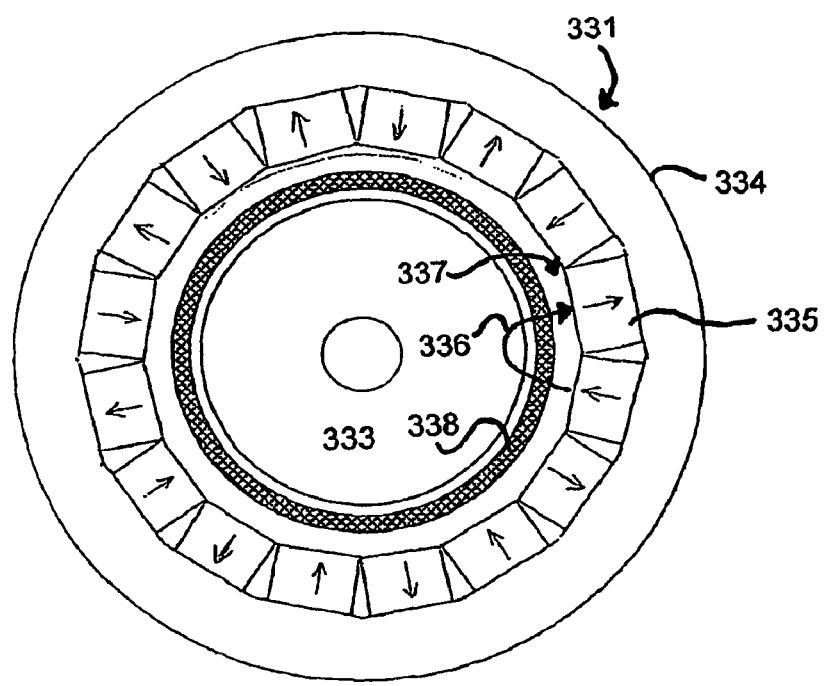
FIG. 19B is a schematic end elevation of the brushless motor-generator in FIG. 19A.
Figure 24:
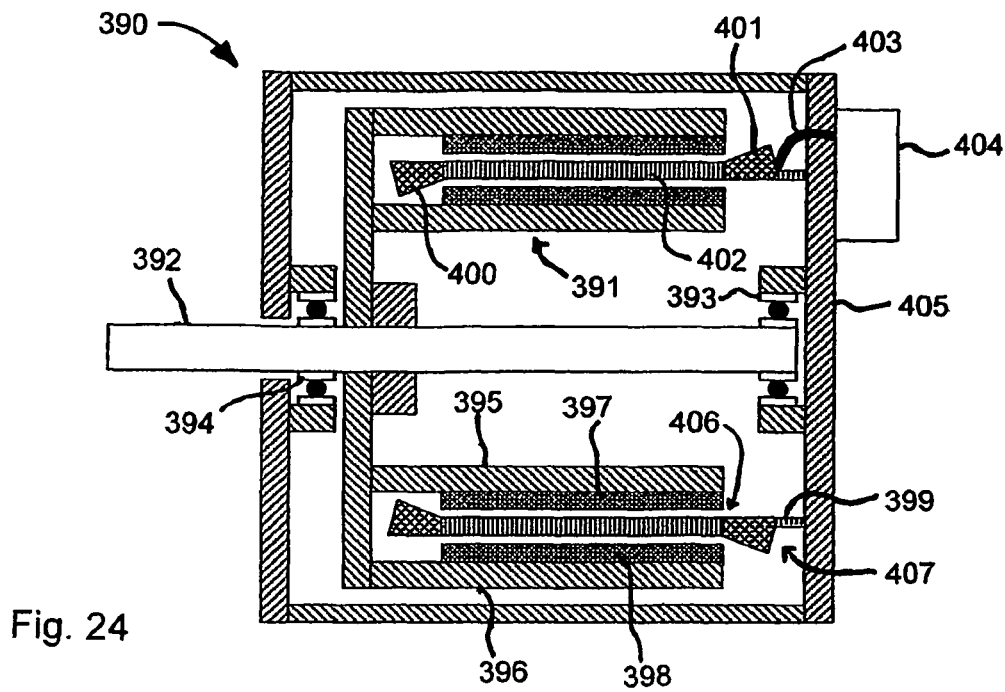
FIG. 24 is a schematic cross-sectional side elevation of a second alternate configuration brushless permanent magnet motor-generator in accordance with the invention.

The motor-generator in accordance with this invention can be constructed with an axial magnetic airgap, as has been shown in FIG. 3A, or radial gap construction can also be employed, using a corollary cylindrical structure and armature winding construction, as illustrated by a radial gap brushless motor-generator 330 shown in FIGS. 19A and 19B. The motor-generator 330 includes a stationary stator 332 and a rotor 331 having shafts 339, 340 that are journalled for rotation in bearings 341, 342 to provide for rotation of the rotor 331 relative to the stator 332. The bearings 341, 342 are supported by housing end plates 343, 344, which are connected by an outer housing tube 345. The rotor 331 has a central steel cylinder section 333 and an outer co-axial hollow steel tube 334 connected by a disc 348 at one end to the central section 333 and open at the other end. Together, the central section 333 and the outer steel tube form two radially spaced apart co-rotating ferromagnetic rotor portions. Radially magnetized magnets 335 of circumferentially alternating polarity are attached to the outer tube 334, as shown in FIG. 19B. The advantage of radial gap construction is a smaller diameter comparable with standard equivalent power rated induction motors. This diameter reduction does though come at the expense of a lower magnet tip speed and potentially increased magnet costs. Magnets may also be attached to the inner cylinder 333, if desired, as shown in the embodiment of FIG. 24. The magnets 335 drive magnetic flux 336 across an armature magnetic airgap 337 defined between the inner surface of the magnets 336 and the outer surface of the central steel cylinder section 333. The magnets 335 drive flux 336 through a flux path that includes a radial portion across the airgap 337, and circumferential portions through the inner steel cylinder 333 and the outer co-axial hollow steel tube 334.

The stator 332 includes an air core armature 338 that is fastened to an end plate 334 facing the open end of the rotor 331, and extends axially into the magnetic airgap 337. The armature 338 is constructed with a substantially nonmagnetic and low electrical conductivity cylindrical form having channels and windings wound into the channels as described previously and as described in more detail in conjunction with FIGS. 24-26. For maximizing power density capability, liquid cooling can also be added to the armature. One method is to run liquid cooling lines through the form and adjacent to the windings. A synchronous variable speed motor drive inverter provides synchronous AC power to energize the armature windings. The synchronous AC power in the armature windings interacts with the alternating flux in the airgap 337 produced by the rotating array of magnets to exert a torque on the rotor 331 which is transmitted through a connection on the shaft 340 to drive a load. Air cooling holes 346, 347 provide for airflow through the rotor 331 and cooling of the armature 338.

As shown in FIG. 20, another armature 350 for an axial gap brushless motor-generator has serpentine windings 351 that are wound multiple times circumferentially into a serpentine slot in an armature form 356. The windings 351 have a start 352 and an end 353. To prevent overlapping 355 of the end 353 from interfering with flat stacking of multiple forms, as shown in FIG. 21, the armature 350 has a circumferential cut out section 354.

The stacking of a multiple phase armature is shown in FIG. 21. The stacked armature 360 is comprised of three phases 361, 362, 363 that are axially assembled together. Each phase 361, 362, 363 uses a substantially low electrical conductivity form 364 having a backing 367 and upwardly opening channels 366. Litz wire windings 365 are placed in the channels 366. As shown, the channels are rectangular and the wire has been precompressed to a rectangular cross section prior to winding. This facilitates a more easily compacted high-density construction without the need for high-pressure compaction after winding. The channels 366 are shown with radiused inner corners, however the corners can be made square to better match the rectangular compressed wire. Also shown with the stacked armature 360, the windings of each phase are spaced more closely together circumferentially in the active length region (shown) than if circumferentially uniformly distributed about the width of that active length region. It has been found that this close packing can be done in some cases to increase the efficiency of the motor-generator by reducing the resistive losses and increasing the back emf for the given design.

Figure 23:
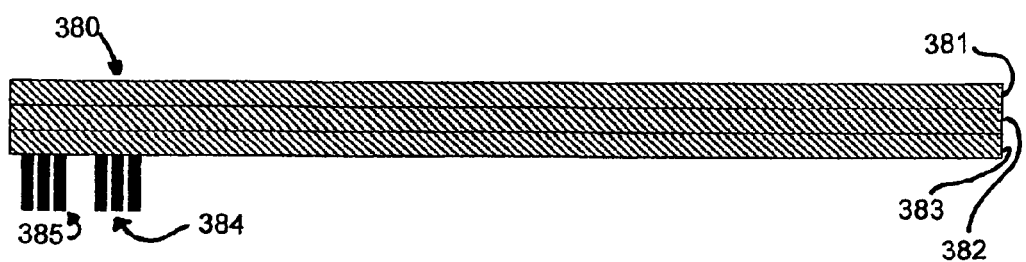
FIG. 23 is a schematic drawing of the phase stacking of the armature winding of FIG. 21 to produce an armature for a three-phase motor-generator in accordance with the invention.

As shown in FIGS. 22 and 23, another configuration winding for a brushless motor generator armature 370 includes a substantially nonmagnetic and low electrical conductivity form 371 with Litz wire windings 372 that are wound into channels in the form 371. The windings 372 have a start 373 and end 374. A multi-phase armature 380, shown in FIG. 23, is constructed by stacking together the different phases 381, 382, 383, each wound as shown in FIG. 22. The forms 371 have axial holes 373, 374 for exiting of the windings 372 from the low electrical conductivity forms 371 to prevent overlapping of windings of a single phase on a form. Corresponding exit holes (not shown) are made in the middle and bottom forms for passing the leads of the top and middle phases 381, 382 to axially exit the stacked armature 380. In this method, the windings can be dielectrically isolated from each other at all locations as well as be completely supported by form channels around the circumference of the armature. It is therefore possible to use un-served Litz wire without the need for the added dielectric breakdown strength of the outside wire sheath. This un-served Litz wire is more flexible and easier to wind as well as more compactable for higher winding density and motor-generator efficiency. Holes 375 are made around the inside and outside periphery of the form 371 to ensure proper alignment of the forms so that the phases are correctly positioned relative to each other, and to securely attach the forms together in the stacked assembly. The holes also receive fasteners for holding the armature in the desired position in the armature airgap.

Another radial gap brushless motor-generator 390, shown in FIG. 24, has a rotor 391 that includes a shaft 392 supported by bearings 393, 394, and inner and outer co-rotating steel tubes 395 and 396 that are radially separated to form a radial armature airgap 406. Radially magnetized magnets 397, 398, arranged in a circumferentially alternating polarity array as shown in FIG. 19B, but in this embodiment on both sides of the airgap, drive magnetic flux radially back and forth across the armature airgap 406. The magnetic flux flows circumferentially in the inner and outer steel tubes between circumferentially adjacent magnets to close the flux loops. A cylindrical air core armature 407 is located in the armature airgap 406 to covert between electrical and rotational energy. The armature 407 has an active length region 402 and axial end turns 400 and 401. The end turns 400, 401 are thicker in the direction of the magnetic airgap than the active length region 402. The end turns 400, 401 protrude radially in opposite directions to allow for easy assembly of the motor 390. The winding leads 403 exit the armature 407 to an electric box 404 located external to the housing 405.

The box 404 can hold a motor controller, such as a synchronous variable speed motor drive inverter for providing synchronous AC power to energize the armature windings and electrically power the motor 390. To eliminate the requirements for accurate motor commutation phasing and also the running of sensor wires from the motor to the drive that can pick up electrical noise impeding proper operation if long, the motor drive preferably utilizes a sensorless control. More preferably, to allow for accurate and robust motor control, the motor drive inverter employs sensorless flux vector control. This type of control provides for high efficiency with good power factor reflected to the power supply and also provides optimal torque and speed control capability with the double rotating air core motor construction. The high performance of sensorless flux vector control synergistically cooperates with the increased performance capability of the air core armature motor. This motor controller can also be used in the motors shown in FIGS. 3A and 19A.

Figure 25:
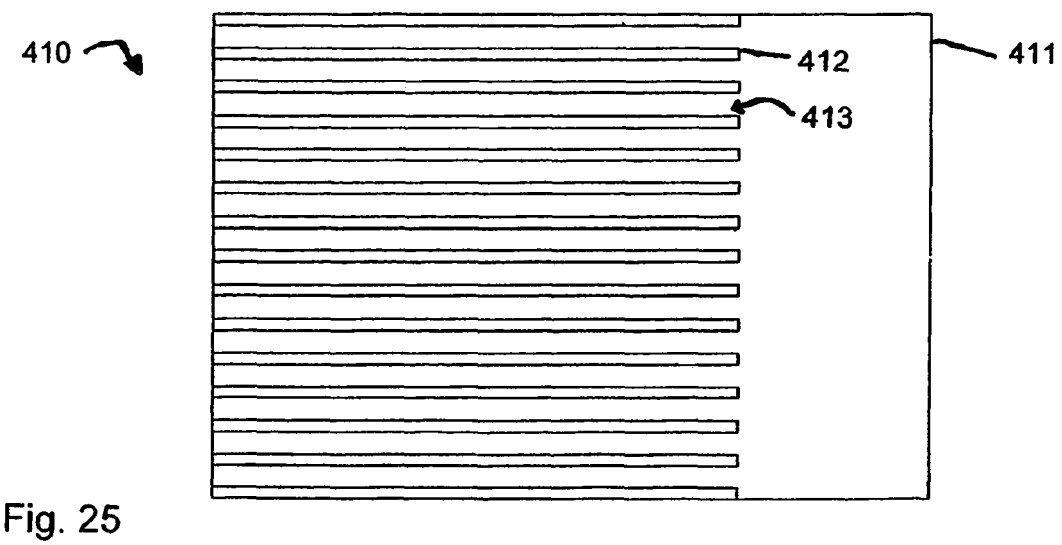
FIG. 25 is a schematic developed plan view of the armature form of the brushless motor generator of FIG. 24.
Figure 26:
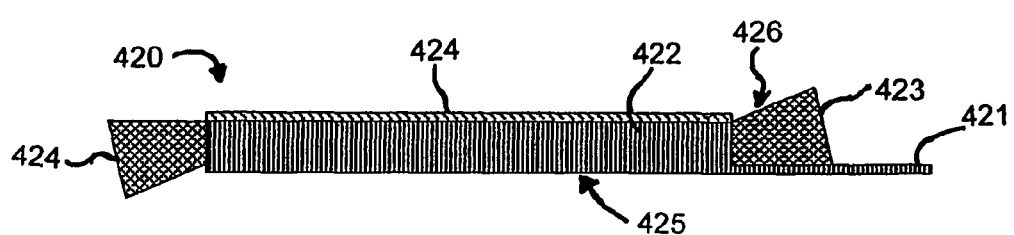
FIG. 26 is a schematic drawing of a portion of the assembled armature of the brushless motor-generator of FIG. 24.

The armature form for the radial gap motor-generator 390 is shown in FIG. 25 in "unrolled" or flat view for clarity of illustration. The form 410 is a plastic tube having a backing portion 411 and radially protruding ridges 412 that define therebetween channels 413 that open radially outward, and into which the windings are wound. To allow for the end turns on the free end of the stator to be radially displaced inward, the backing portion 411 is omitted at the free end. The assembled air core armature of the motor-generator is shown in FIG. 26. The armature 407 is comprised of the low electrical conductivity form 410 that has a backing portion 421 and radially opening channels 413 in the active length region 402. Litz wire windings 426 are wound onto the form with the end turns 401 and 400 located at the axial ends. A tension wrap 424 may be wound circumferentially around the form 411 to radially compress the windings 426 into the channels 413. The wrap 424 may be a fiber band, tape or other means that is radially thin and has sufficient strength to provide the required compression.

Figure 27:
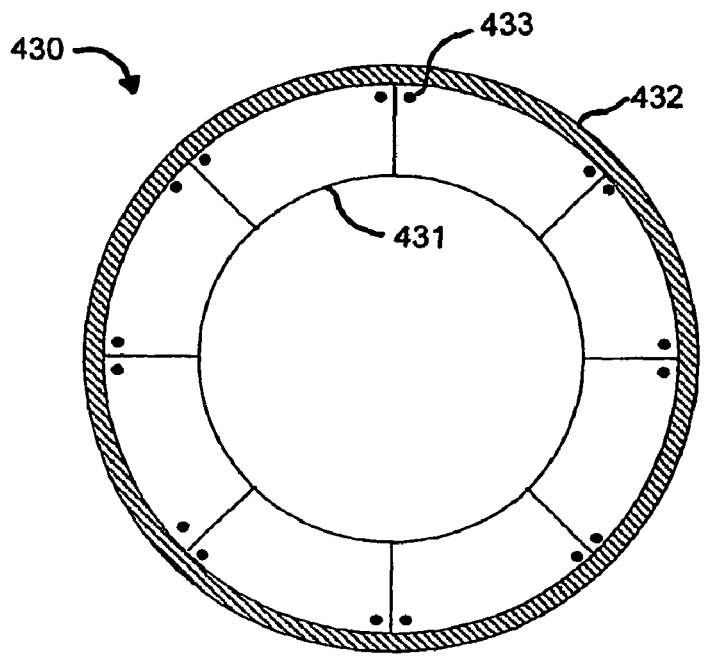
FIG. 27 is a schematic drawing of a large armature form assembled from multiple circumferential section forms in accordance with the invention.

A large armature form assembled from multiple circumferential section forms is shown in FIG. 27. For larger motors or generators, it may be easier and more practical or cost effective to assemble the armature from multiple pieces. Machining or molding a single large form may not be economically feasible. One application of very large generators is in direct drive wind turbines that can have a diameter of 15 feet or more. The armature 430 is comprised of multiple circumferential form sections 431 that are attached to a supporting structure 432, potentially through the use of bolts 433 or other fasteners. The windings, not illustrated, can be wound on to the form sections 431 prior to assembly together. Alternatively, it may be easier to do the winding after assembly of the form for reducing the required number of electrical connections.

Figure 28:
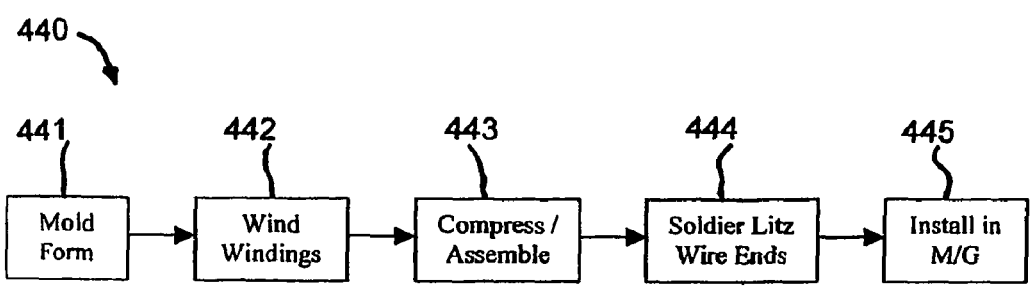
FIG. 28 is block flow diagram illustrating the steps of a process for construction of an air core armature for use in a brushless motor-generator in accordance with the invention.

A process for construction of an air core armature for use in a brushless motor-generator in accordance with the invention is illustrated in FIG. 28. The armature form is made, preferably by molding or forming the form material into the desired configuration, as indicated in Step 441. This contrasts with other air core armature construction techniques where the windings are wound first and then molded or encapsulated as the final step. After making the form in Step 441, the windings are wound onto the forms in Step 442. Multiple windings and or forms are assembled and/or compressed in Step 443. The Litz wire ends are soldiered in Step 444 to ensure good electrical conduction to all individually insulated strands of the wires. The armature is then installed in Step 445 into the motor-generator.

The motors made in accordance with this invention are low in cost and high in efficiency, and they can also function equally well as generators for power generation applications, and as motor-generators for flywheel storage systems. For example, a motor-generator in accordance with the invention can be use in flywheel energy storage systems such as those shown in application Ser. No. 09/977,678 entitled "Inductor Alternator Flywheel System" filed on Oct. 15, 2001.

Obviously, numerous modifications and variations of the described preferred embodiment are possible and will occur to those skilled in the art in light of this disclosure of the invention. For example, although all disclosed embodiment shown herein use permanent magnets to produce magnetic flux that interacts with the armature in the airgap, it is contemplated that the flux could instead be produced by stationary field coils, conventional or superconducting. Field coil motor-generators are shown in application Ser. No. 10/319,190 entitled "Lightweight High Power Electrical Machine" filed on Dec. 13, 2002, and U.S. Pat. No. 6,750,588 entitled "High Performance Axial Gap Alternator Motor" issued on Jun. 15, 2004.

Accordingly, we intend that these modifications and variations, and the equivalents thereof, be included within the spirit and scope of the invention as defined in the following claims, wherein we claim:

1. A motor-generator for converting between electrical and rotary mechanical energy comprising:
    a rotor that rotates about an axis of rotation and is constructed of two spaced apart co-rotating rotor portions having magnetic poles that drive magnetic flux across an armature airgap formed therebetween;
    an armature that magnetically interacts with said rotor, said armature being located in said armature airgap and having a substantially nonmagnetic and low electrical conductivity form, and wire windings that are wound onto said form;
    said form having a free end that extends inside said rotor and a support end that attaches to the stationary portion of said motor-generator;
    said form is constructed with a thin backing portion and thicker raised portions extending from said backing portion in the direction of said magnetic flux;
    said wire windings comprising multiple individually insulated conductor wire inserted to lie in spaces between said raised portions, wherein the conductors of a single wire are electrically connected together in parallel and electrically insulated between each other along their length inside said armature airgap;
    wherein said form provides position location and support for said wire windings during the winding process, and subsequent reaction of electromagnetically induced torque on said windings to said stationary portion of said motor-generator through said support end of said form, and prevents said windings from contacting said rotor portions during rotation of said rotor.

2. A motor-generator as described in claim 1 wherein:
    said windings are wound with a single phase per layer and a multiple . phase armature is constructed by assembling multiple forms together in a stacked assembly.

3. A motor-generator as described in claim 2 further comprising:
    holes in said forms for aligning said forms in said stacked assembly so that multiple phases are properly off-set from each other by a suitable angular displacement, and for receiving fasteners for attaching said forms securely together in said stacked assembly.

4. A brushless motor-generator as described in claim 1 wherein:
    a multiple wire serpentine is formed by winding multiple turns of one wire multiple times around the circumference of said armature.

5. A brushless motor-generator as described in claim 1 wherein:
    said form is free of a backing portion at circumferential positions where overlapping of windings occur.

6. A brushless motor-generator as described in claim 1 herein:
    said spaces between said raised portions of said form are approximately equal to the width of one wire of said wire windings.

7. A brushless motor-generator as described in claim 1 wherein:
    said wire is precompressed into a rectangular cross-section prior to winding said windings on to said form.

8. A brushless motor-generator as described in claim 1 wherein:
    said air core armature comprises multiple phase windings, wherein multiple phases are wound onto a single form.

9. A brushless motor-generator as described in claim 1 wherein:
    said windings of a phase are spaced more closely together circumferentially In the active length region than if circumferentially uniformly distributed about the width of the pole pitch.

10. A brushless motor-generator as described in claim 1 wherein:
    said form is injection molded prior to winding said armature.

11. A brushless motor-generator as described in claim 1 wherein:
    said armature airgap is radial and said form comprises a tube.

12. A brushless motor-generator as described in claim 1 wherein:
    a large diameter form is constructed by assembling together multiple circumferential arc form sections.

13. A brushless motor-generator as described in claim 1 wherein:
    said armature is energized by a synchronous variable speed motor drive inverter that provides synchronous AC power to said windings;
    said synchronous variable speed motor drive inverter utilizes sensorless flux vector control.

14. A brushless motor-generator as described in claim 1 wherein:
    said form is attached to said stationary portion of said motor-generator with a means to allow for thermal expansion of said form relative to said stationary portion of said motor-generator.

15. A motor-generator for converting between electrical and rotary mechanical energy comprising:
    a rotor that rotates about an axis of rotation and is constructed of two spaced apart ferromagnetic rotor portions having permanent magnets on the surfaces of both said rotor portions that drive magnetic flux across an armature airgap formed therebetween;
    an armature located in said armature airgap comprising a substantially nonmagnetic and low electrical conductivity form and wire windings that are wound on to said form;

said form having a free end that extends inside said rotor and a support end that attaches to the stationary portion of said motor-generator;

said wire windings comprising multiple individually insulated and electrically parallel-connected conductors;

said wire windings are wound directly on to said form by inserting wires in to channels on the surface of said form wherein said channels provide both position location during winding and structural support for said windings in operation.

16. A motor-generator as described in claim 15 wherein:

said windings are wound with a single phase per layer and a multiple phase armature is constructed by assembling multiple forms together in a stacked assembly.

17. A brushless motor-generator as described in claim 15 wherein:

a multiple wire serpentine is formed by winding multiple turns of one wire multiple times around the circumference of said armature.

18. A brushless motor-generator as described in claim 15 wherein:

no backing portion of said form is provided at circumferential positions where overlapping of windings occur.

19. A brushless motor-generator as described in claim 15 wherein:

the width of said channels of said form is approximately equal to the width of one wire of said wire windings.

20. A brushless motor-generator as described in claim 15 wherein:

said windings comprise active lengths that traverse substantially non-circumferentially and end turns that traverse substantially circumferentially;

said end turns are located outside of said armature airgap.

21. A brushless motor-generator as described in claim 15 wherein:

said air core armature comprises multiple phase windings, wherein multiple phases are wound onto a single form.

22. A brushless motor-generator as described in claim 15 wherein:

said windings of a phase are spaced more closely together circumferentially in the active length region than if circumferentially uniformly distributed about the width of the pole pitch.

23. A brushless motor-generator as described in claim 15 wherein:

said form is injection molded prior to winding said armature.

24. A brushless motor-generator as described in claim 15 wherein:

said armature airgap is radial and said form comprises a tube.

25. A brushless motor-generator as described in claim 15 wherein:

a large single form is constructed by assembling together multiple circumferential arc form sections.

26. A brushless motor-generator as described in claim 15 wherein:

said armature is energized by a synchronous variable speed motor drive inverter that provides synchronous AC power to said windings;

said synchronous variable speed motor drive inverter utilizes sensorless flux vector control.

27. A brushless motor-generator as described in claim, 15 wherein:

said form is attached to said stationary portion of said motor-generator with a means to allow for thermal expansion of said form relative to said stationary portion of said motor-generator.

28. A motor-generator for converting between electrical and rotary mechanical energy comprising:

a rotor that rotates about an axis of rotation and is constructed of two spaced apart rotor portions having magnetic poles that drive magnetic flux across an armature airgap formed therebetween;

an armature located in said armature airgap comprising a substantially nonmagnetic and low electrical conductivity form and wire windings that are wound on to said form;

said form having a free end that extends inside said rotor and a support end that attaches to the stationary portion of said motor-generator, said form is constructed with a thin backing portion between said free end and said support end wherein said backing portion has raised surface features that mechanically clamp said wire windings and provide holding force during the winding process;

said form provides position location and support for said windings, and subsequent transmission of the electromagnetically induced torque on said windings to said stationary portion of said motor-generator through said support end of said form and prevents said windings from contacting said rotor portions during rotation of said rotor.

29. A motor-generator as described in claim 28 wherein:

said windings are wound with a single phase per layer and a multiple phase armature is constructed by assembling multiple forms together in a stacked assembly.

30. A brushless motor-generator as described in claim 28 wherein:

a multiple wire serpentine is formed by winding multiple turns of one wire multiple times around the circumference of said armature.

31. A brushless motor-generator as described in claim 28 wherein:

no backing portion of said form is provided at circumferential positions where overlapping of windings occur.

32. A brushless motor-generator as described in claim 28 wherein:

the space between said raised surface features of said form is approximately equal to the width of one wire of said wire windings.

33. A brushless motor-generator as described in claim 28 wherein:

said windings comprise active lengths that traverse substantially non-circumferentially and end turns that traverse substantially circumferentially;

said end turns are located outside of said armature airgap.

34. A brushless motor-generator as described in claim 28 wherein:

said air core armature comprises multiple phase windings, wherein multiple phases are wound onto a single form.

35. A brushless motor-generator as described in claim 28 wherein:

said form is injection molded prior to winding said armature.

36. A brushiess motor-generator as described in claim 28 wherein:

said form is attached to said stationary portion of said motor-generator with a means to allow for thermal expansion of said form relative to said stationary portion of said motor-generator.

37. A motor-generator for converting between electrical and rotary mechanical energy comprising:
- a rotor that rotates about an axis of rotation with magnetic poles that drive magnetic flux across an armature airgap;
- an armature located in said armature airgap comprising a substantially nonmagnetic and low electrical conductivity form and wire windings that are wound on to said form;
- said form is constructed with a thin backing portion and thicker raised portions extending from said backing portion in the direction of said magnetic flux;
- said wire windings are wound on to said form and said form holds said windings mechanically by squeezing said wires across the diametral cross-section of the wires;
- said form further provides transmission of the electromagnetically induced torque on said windings to said stationary portion of said motor-generator.

38. A motor-generator as described in claim 37 wherein:
said wire windings comprise multiple individually insulated conductor wire wherein the conductors of a single wire.are electrically connected together in parallel and electrically insulated between each other along their length inside said armature airgap.

39. A motor-generator as described in claim 37 wherein:
said form is constructed with molded plastic.

40. A motor-generator as described in claim 37 wherein:
said form mechanically squeezes said windings where located inside said armature airgap.

* * * * *